United States Patent [19]
Doi et al.

[11] Patent Number: 5,480,283
[45] Date of Patent: * Jan. 2, 1996

[54] GAS TURBINE AND GAS TURBINE NOZZLE

[75] Inventors: Hiroyuki Doi, Ibaraki; Ken Yasuda, Hitachi; Tetsuo Kashimura, Hitachi; Yutaka Fukui, Hitachi, all of Japan

[73] Assignee: Hitachi, Ltd., Tokyo, Japan

[*] Notice: The portion of the term of this patent subsequent to Dec. 6, 2011, has been disclaimed.

[21] Appl. No.: 246,624

[22] Filed: May 20, 1994

Related U.S. Application Data

[63] Continuation-in-part of Ser. No. 965,699, Oct. 23, 1992, Pat. No. 5,370,497.

[30] Foreign Application Priority Data

Oct. 24, 1991  [JP]  Japan ................................. 3-277452

[51] Int. Cl.⁶ ..................... C22C 30/00; C22C 19/05; F01D 1/02
[52] U.S. Cl. .................. 415/199.5; 415/200; 148/428; 148/425; 420/448; 420/436
[58] Field of Search ................. 415/199.5, 200, 415/244 A; 148/428, 425; 420/448, 436; 60/39.37, 909; 416/241 R, 212 A, 244 A

[56] References Cited

U.S. PATENT DOCUMENTS

| | | |
|---|---|---|
| 4,850,187 | 7/1989 | Siga et al. . |
| 5,008,072 | 4/1991 | Siga et al. . |
| 5,370,497 | 12/1994 | Doi et al. ............................. 415/199.5 |

*Primary Examiner*—Deborah Yee
*Attorney, Agent, or Firm*—Antonelli, Terry, Stout & Kraus

[57] ABSTRACT

A Ni-base superalloy consisting essentially of, by weight: 0.05 to 0.20% C, 20 to 25% Co, 15 to 25% Cr, 1.0 to 3.0% Al, 1.0 to 3.0% Ti, 1.0 to 3.0% Nb, 5 to 10% W, and at least 55% Ni, the combination of the [Al+Ti] and tungsten contents being determined as shown in FIG. 5. This superalloy has a high thermal-fatigue resistance, a great high-temperature strength, particularly, a great creep rupture strength, and a good weldability. The superalloy is used to form gas turbine nozzles, which are employed in a gas turbine. Using such a gas turbine, a combined power generating system is built.

29 Claims, 9 Drawing Sheets

F I G. 1
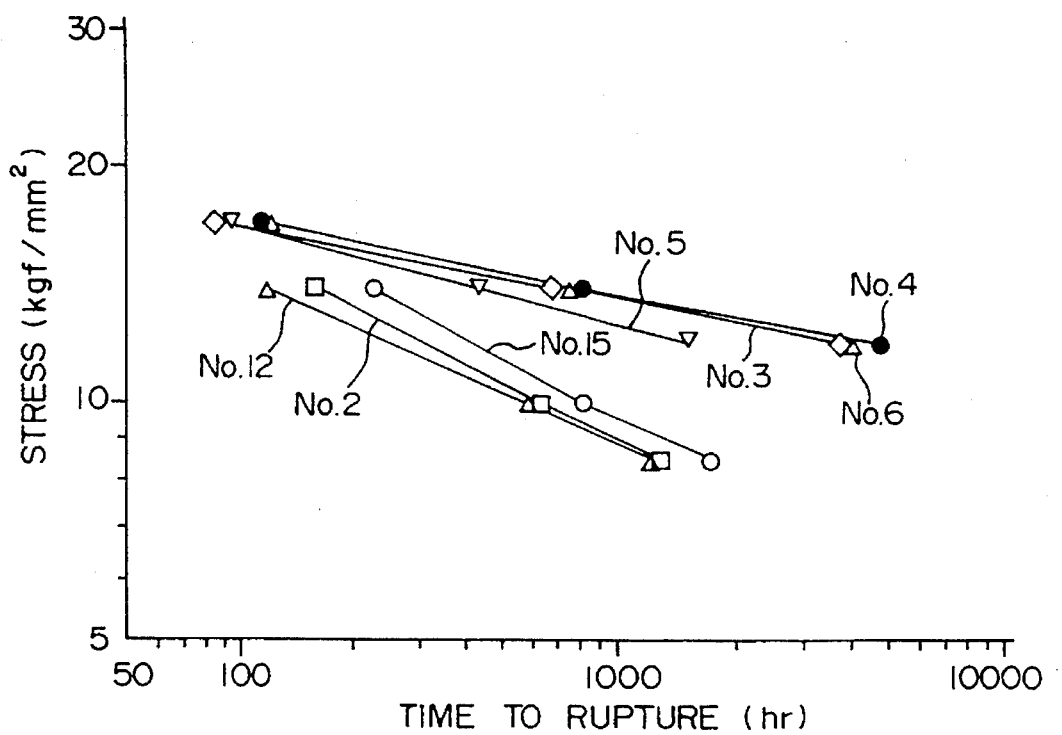
F I G. 2
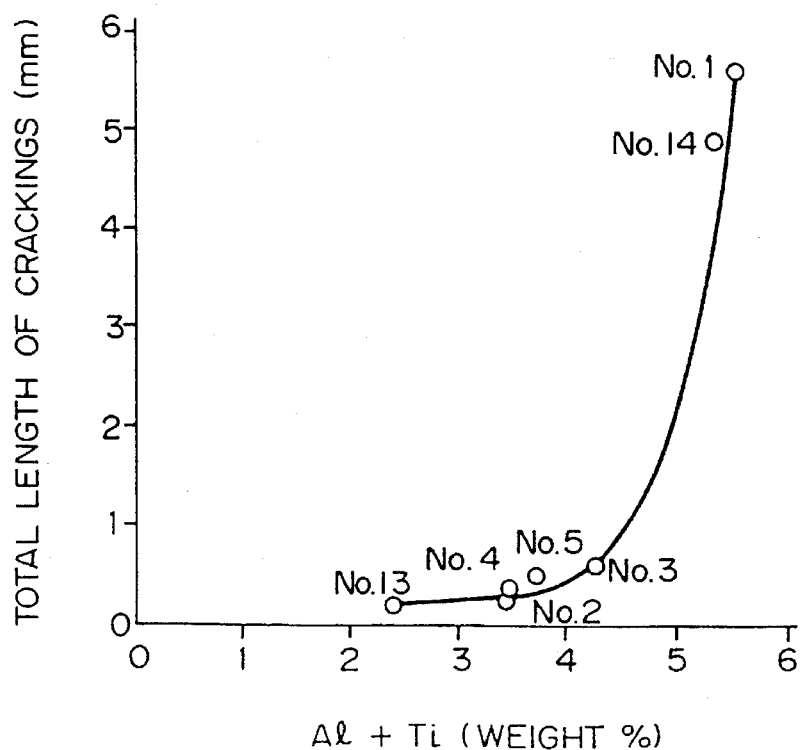

GAS TURBINE AND GAS TURBINE NOZZLE

REFERENCE TO RELATED APPLICATION

This application is a continuation in part of U.S. application Ser. No. 07/965,699 filed Oct. 23, 1992.

BACKGROUND OF THE INVENTION

The present invention relates to a novel nickel-base superalloy and, more particularly, to a gas turbine and a gas turbine nozzle which are formed of such a superalloy and, further, a combined power generating system employing such a gas turbine and a steam turbine.

Cobalt-base alloys have been widely used as materials of industrial gas turbine nozzles (stationary blades) because of their favorable corrosion-resistance and weldability. However, because the combustion temperature (the temperature at the inlet of a gas turbine) has recently been increased in order to improve thermal efficiency, there is an increasing need for an alloy having great high-temperature strength and thermal-fatigue resistance to replace cobalt-base alloys. Nickel-base superalloys, which are used for blades (buckets), have greater high-temperature strength and thermal-fatigue resistance than cobalt-base alloys. However, because conventional nickel-base superalloys have poor weldability, they are not very suitable materials for gas turbine nozzles, which require welding, for example, repair welding.

Nickel-base superalloys for gas turbine nozzles are disclosed in JP-A-60-10064 and U.S. Pat. No. 4,039,330, and an improved nickel-base superalloy for gas turbine nozzles in U.S. Pat. No. 4,810,467.

Although the above conventional art improves weldability of nickel-base superalloys, it provides no improvement in high-temperature strength, particularly, high-temperature strength over a long term, which is essential to increase the tolerable temperature and durability of the gas turbine nozzles.

SUMMARY OF THE INVENTION

Accordingly, an object of the present invention is to provide a nickel-base superalloy having good thermal-fatigue resistance, high-temperature strength, particularly creep rupture strength and weldability. Another object of the present invention is to provide gas turbine nozzles formed of such nickel-base superalloy and a combined power generating system comprising a steam turbine and a gas turbine which employs such gas turbine nozzles.

To achieve the above objects, the nickel-base superalloy of the invention acquires an improved weldability by reducing the amounts of additive Al, Ti and other elements so as to reduce precipitates of $\gamma'$ phase, which is a basic strengthening factor in nickel-base superalloys.

To increase the high-temperature strength, particularly the high-temperature strength over a long term, the amounts of additive and/or Mo, which are solid-solution strengthening elements, are carefully controlled, and the precipitation of harmful phases which adversely affect the strength is substantially prevented.

A nickel-base superalloy according to the present invention has a certain composition such that the superalloy acquires 14 kg/mm$^2$ rupture strength at 900° C. for 300 hours or longer, a thermal-fatigue resistance of 600 or more of number of cycles to crack at 900° C.–350° C., and such a weldability that satisfactory welding can be performed with pre-heating at 400° C. or lower.

According to one aspect of the present invention, a gas turbine comprises: a compressor for compressing air; a plurality of nozzles for directing combustion gas which has been formed by using compressed air from the compressor and fuel; a rotor shaft; a plurality of discs provided on the rotor shaft; and a plurality of blades which are embedded in each of the discs, the combustion gas from the nozzles striking the blades so that the rotor shaft rotates, the nozzles being provided in a ring-arrangement surrounding the blades, each nozzle having two side walls and one blade portion formed between the two side walls, and being formed on a nickel-base superalloy consisting essentially of, by weight: 0.05 to 0.20% carbon, 15 to 25% Co, 15 to 25% Cr, 1.0 to 3.0% Al, 1.0 to 3.0% Ti, 1.0 to 3.0% Nb, 5 to 10% W (tungsten), and at least 55% Ni, the combination of the [Al+Ti] content and tungsten (W) content being determined within the shadowed hexagonal area including the boundary shown in FIG. 5, of which six vertices are: A(2.5% [Al+Ti], 10% W), B(3% [Al+Ti], 10% W), C(5% [Al+Ti], 7.5% W), D(5% [Al+Ti], 5% W), E(3.5% [Al+Ti], 5% W), and F(2.5% [Al+Ti], 7.5% W). A more preferable area is a pentagonal one defined by the following five points: G(3% [Al+Ti], 9% W), H(4.7% [Al+Ti], 7.5% W), I(4.7% [Al+Ti], 6% W), J(3.5% [Al+Ti], 6% W), K(3% [Al+Ti], 7% W).

According to another aspect of the present invention, a gas turbine has nozzles formed of a nickel-base alloy which remains intact in a 14 kg/mm$^2$ rupture test at 900° C. for 300 hours or longer, and which does not cause cracking in welding beads of 80 mm-long and 8 mm-wide formed by one-pass TIG-welding if the nickel-base superalloy is pre-heated at 400° C. or lower.

According to still another aspect of the present invention, a gas turbine has nozzles each of which has one blade portion and two side walls formed on both sides of the blade, the blade having a dimension between the side walls of 70 mm or greater and a dimension between its inlet-side end and its outlet-side end, and the blade being formed of a nickel-base superalloy.

According to a further aspect of the present invention, a gas turbine has nozzles formed of a nickel-base superalloy composed of, by weight: 0.05 to 0.20% carbon, 15 to 25% Co; 15 to 25% Cr; 1.0 to 3.0% Al; 1.0 to 3.0% Ti; 1.0 to 3.0% Nb; 5 to 10% W; at least one of 0.001 to 0.03% B (boron), up to 1.5% Hf, up to 2% Re, up to 2% V, up to 0.5% Y (yttrium), up to 0.5% Sc and up to 0.5% one or more of rare earth elements; and the balance essentially being Ni, the combination of the [Al+Ti] content and the tungsten content being determined within the shadowed hexagonal area including the boundary shown in FIG. 5, of which six vertices are: A(2.5% [Al+Ti], 10% W), B(3% [Al+Ti], 10% W), C(5% [Al+Ti], 7.5% W), D(5% [Al+Ti], 5% W), E(3.5% [Al+Ti], 5% W), and F(2.5% [Al+Ti], 7.5% W).

According to a still further aspect of the present invention, a gas turbine comprising: a compressor for compressing air; a plurality of nozzles for directing combustion gas which has been formed by using compressed air from the compressor and fuel; a rotor shaft;

discs of three or more stages provided on the rotor shaft; and a plurality of blades which are embedded in each of the discs, the combustion gas from the nozzles striking the blades so that the rotor shaft rotates, the nozzles being provided in a ring-arrangement surrounding the blades, each nozzle having two side walls and one blade portion formed between the two wide walls, the first-stage disc, i.e., the most upstream side disc, being formed of a nickel-base superalloy consisting essentially of, by weight: 0.05% to 0.20% carbon, 20 to 25% Co, 15 to 25% Cr, 1.0 to 3.0% Al, 1.0 to 3.0% Ti, 1.0 to 3.0% Nb, 5 to 10% W, and at least 55% Ni, the second and later-stage discs being formed of a cobalt-base alloy consisting essentially of, by weight: 0.2 to 0.6% C, up to 2% Si, up to 2% Mn, 25 to 35% Cr, 5 to 15% Ni, 3 to 10% W, 0.003 to 0.03% B, and at least 50% Co.

According to a further aspect of the present invention, a gas turbine nozzle is formed of nickel-base superalloy consisting essentially of, by weight: 0.05 to 0.20% carbon, 20 to 25% Co, 15 to 25% Cr, 1.0 to 3.0% Al, 1.0 to 3.0% Ti, 1.0 to 3.0% Nb, 5 to 10% W, and at least 55% Ni, the combination of the [Al+Ti] content and the tungsten content being determined within the shadowed hexagonal area including the boundary shown in FIG. 5, of which six vertices are: A(2.5% [Al+Ti], 10% W), B(3% [Al+Ti], 10% W), C(5% [Al+Ti], 7.5% W), D(5% [Al+Ti], 5% W), E(3.5% [Al+Ti], 5% W), and F(2.5% [Al+Ti], 7.5% W). The gas turbine nozzle may be formed of nickel-base superalloy containing the above-mentioned elements and, further, at least one of the following elements, by weight: 0.001 to 0.03% B, up to 1.5% Hf, up to 2% Re, up to 2% V, up to 0.5% Y, up to 0.5% Sc and up to 0.5% one or more of rare earth elements.

According to a further aspect of the present invention, a nickel-base superalloy is provided, wherein the nickel-base superalloy consisting essentially of, by weight: 0.05 to 0.20% carbon, 20 to 25% Co, 15 to 25% Cr, 1.0 to 3.0% Al, 1.0 to 3.0% Ti, 1.0 to 3.0% Nb, 5 to 10% W, and at least 55% Ni, the combination of the [Al+Ti] content and the tungsten content being determined within the shadowed hexagonal area including the boundary shown in FIG. 5, of which six vertices are: A(2.5% [Al+Ti], 10% W), B(3% [Al+Ti], 10% W), C(5% [Al+Ti], 7.5% W), D(5% [Al+Ti], 5% W), E(3.5% [Al+Ti], 5% W), and F(2.5% [Al;+Ti], 7.5% W). The nickel-base superalloy may further contain at least one of the above-listed alloying elements: 0.001 to 0.03% B, up to 1.5% Hf, up to 2% Re, up to 2% V, up to 0.5% Y, up to 0.5% Sc, or up to 0.5% one or more of rare earth elements.

According to a still further aspect of the present invention, a combined power generating system comprises: a gas turbine driven by combustion gas which flows at high speeds; a waste-heat recovering boiler for recovering energy of exhaust gas of the gas turbine in the form of steam; a steam turbine driven by the steam provided by the waste-heat recovering boiler; and a generator driven by the gas turbine and the steam turbine, wherein: the gas turbine has blades at three or more stages; the combustion gas temperature at the inlet of the gas turbine is 1,200° C. or higher and the exhaust gas temperature at the outlet is 500° C. or higher; the waste-heat recovering boiler provides steam having a temperature of 500° C. or higher; the steam turbine comprises a high and low-pressure combined-type rotor formed of a Ni-Cr-Mo low alloy steel having a bainitic structure, blades longer than 26 inches, and a casing containing the steam turbine.

Further objects, features and advantages of the present invention will become apparent from the following description of the preferred embodiments with reference to the attached drawings.

BRIEF DESCRIPTION OF THE DRABLADES

FIG. 1 is a graph showing the stress/time until rupture curves indicating the creep rupture strengths at 900° C.

FIG. 2 is a graph indicating the relationship between the amount of [Al+Ti] and the total length of weld crackings.

Figure 5:
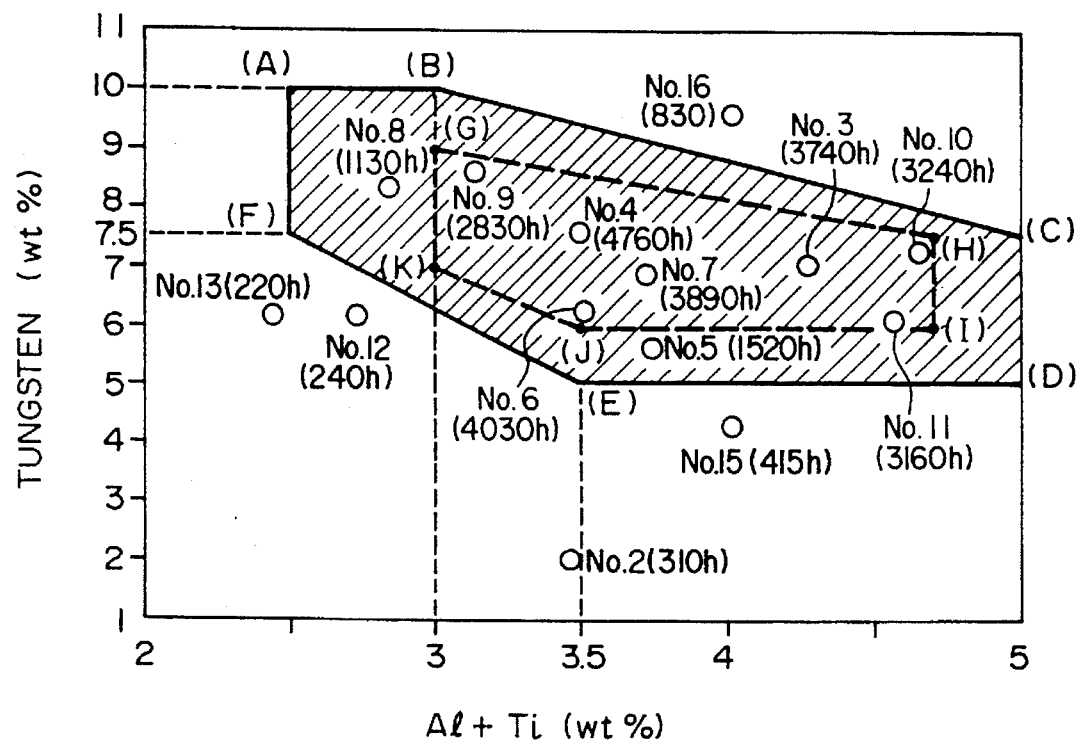

FIG. 5 indicates the relationship between the tungsten and [Al+Ti] contents and the amount of time to creep-rupture.

Figure 6:
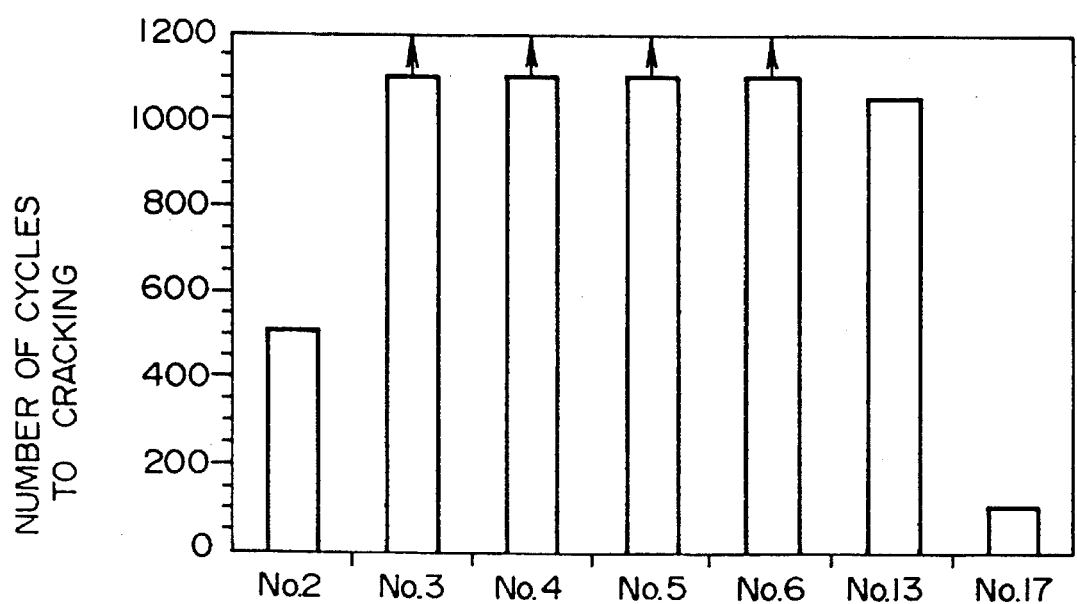

FIG. 6 shows the numbers of heating-cooling cycles to cracking occurred, one heating-cooling cycle being performed by maintaining at 900° C. for 30 minutes and then cooling to 300° C.

Figure 7:
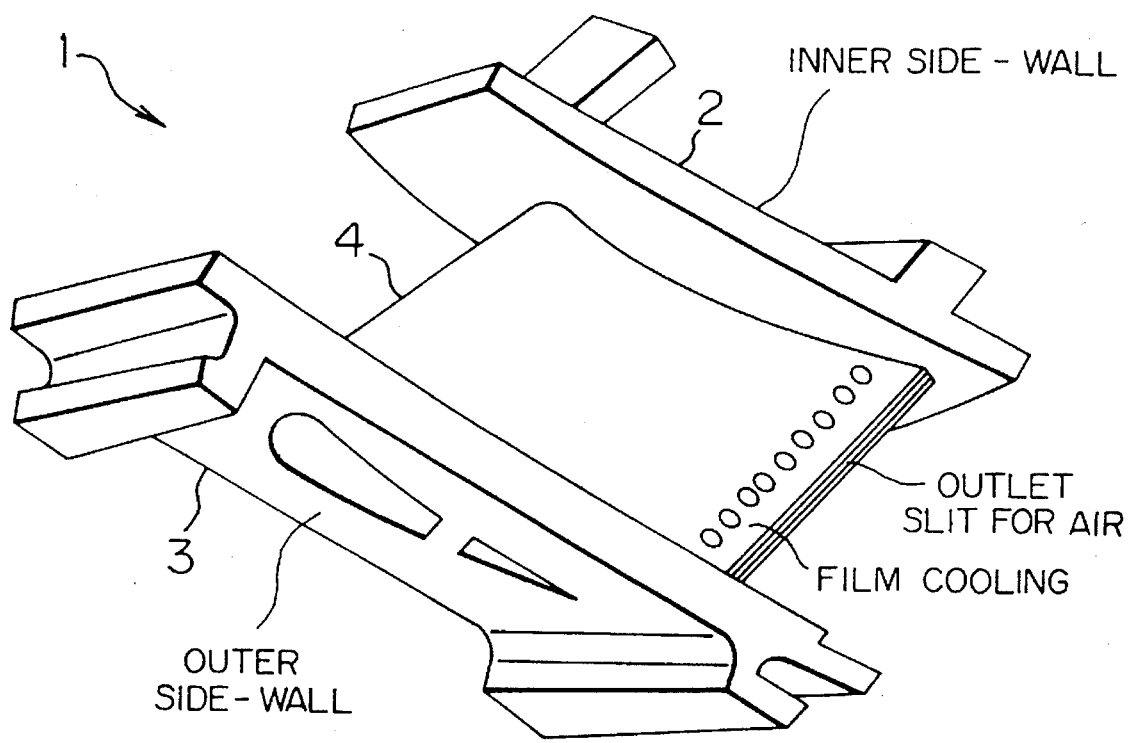

FIG. 7 is a perspective view of a gas turbine nozzle according to the present invention.

Figure 8:
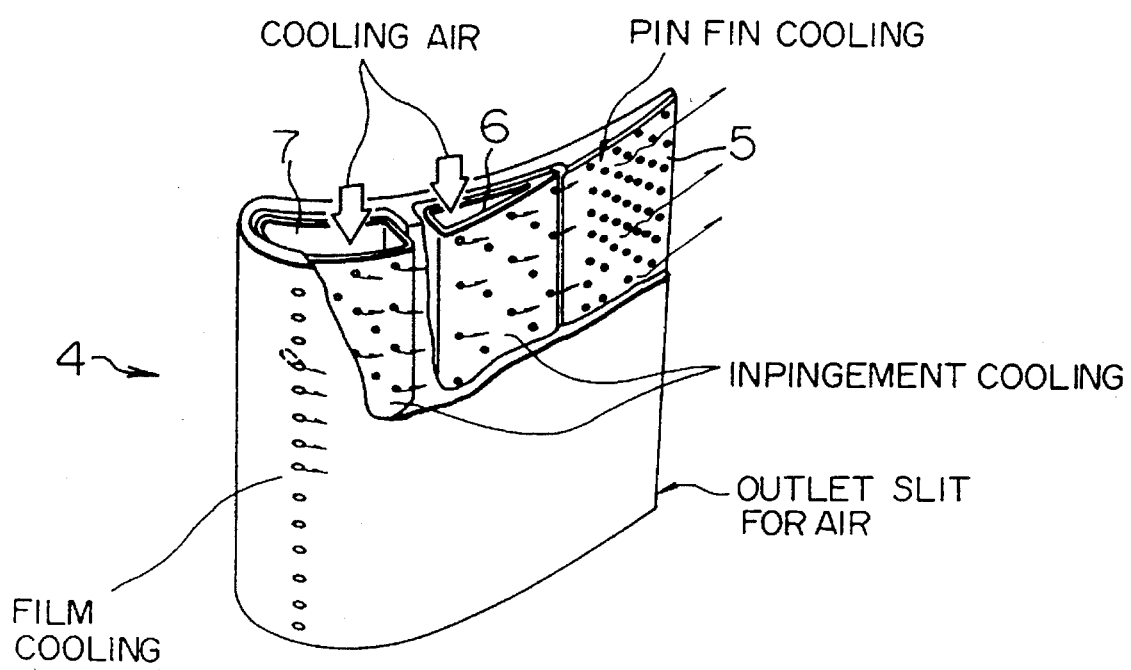

FIG. 8 is a perspective view of the blade portion shown in FIG. 7.

Figure 9:
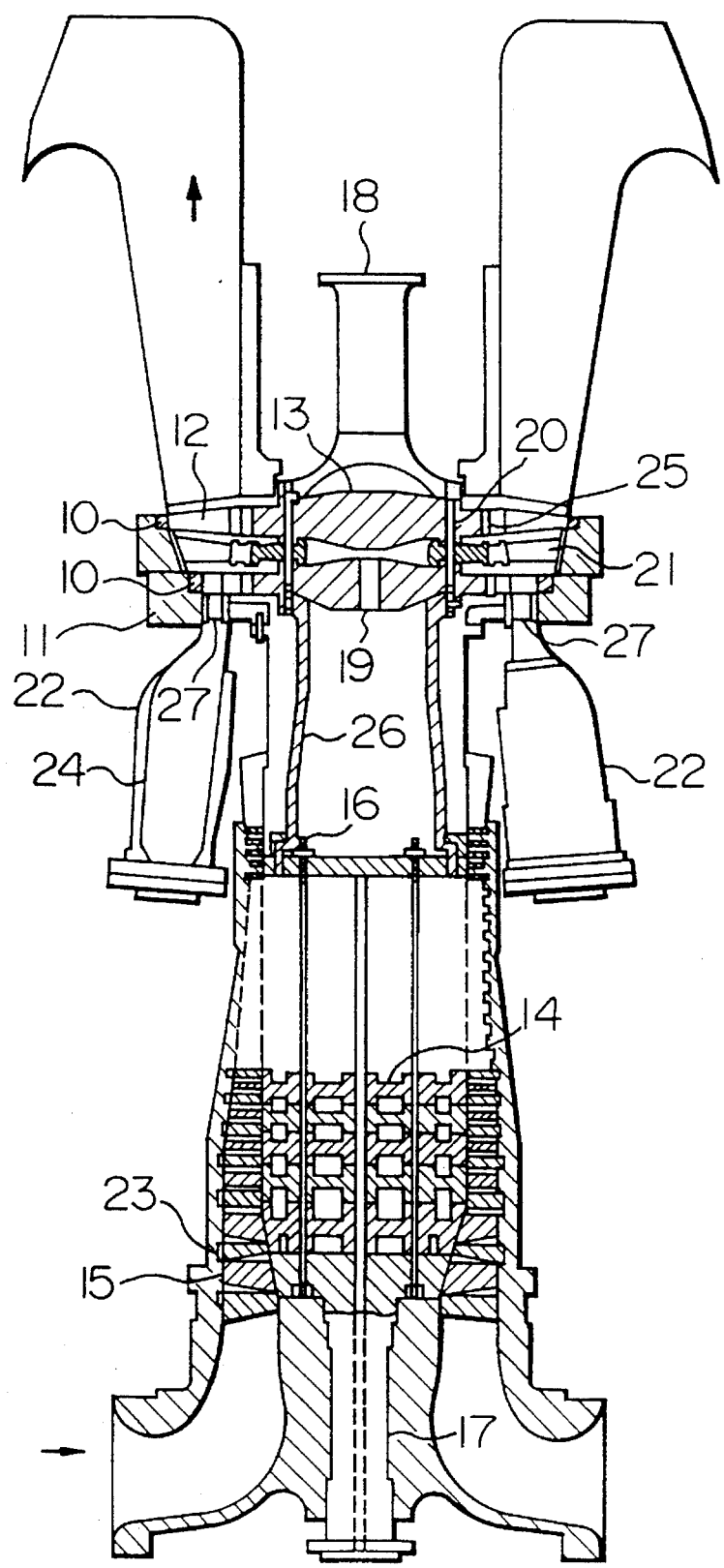

FIG. 9 is a sectional view of a gas turbine according to the present invention.

Figure 10:
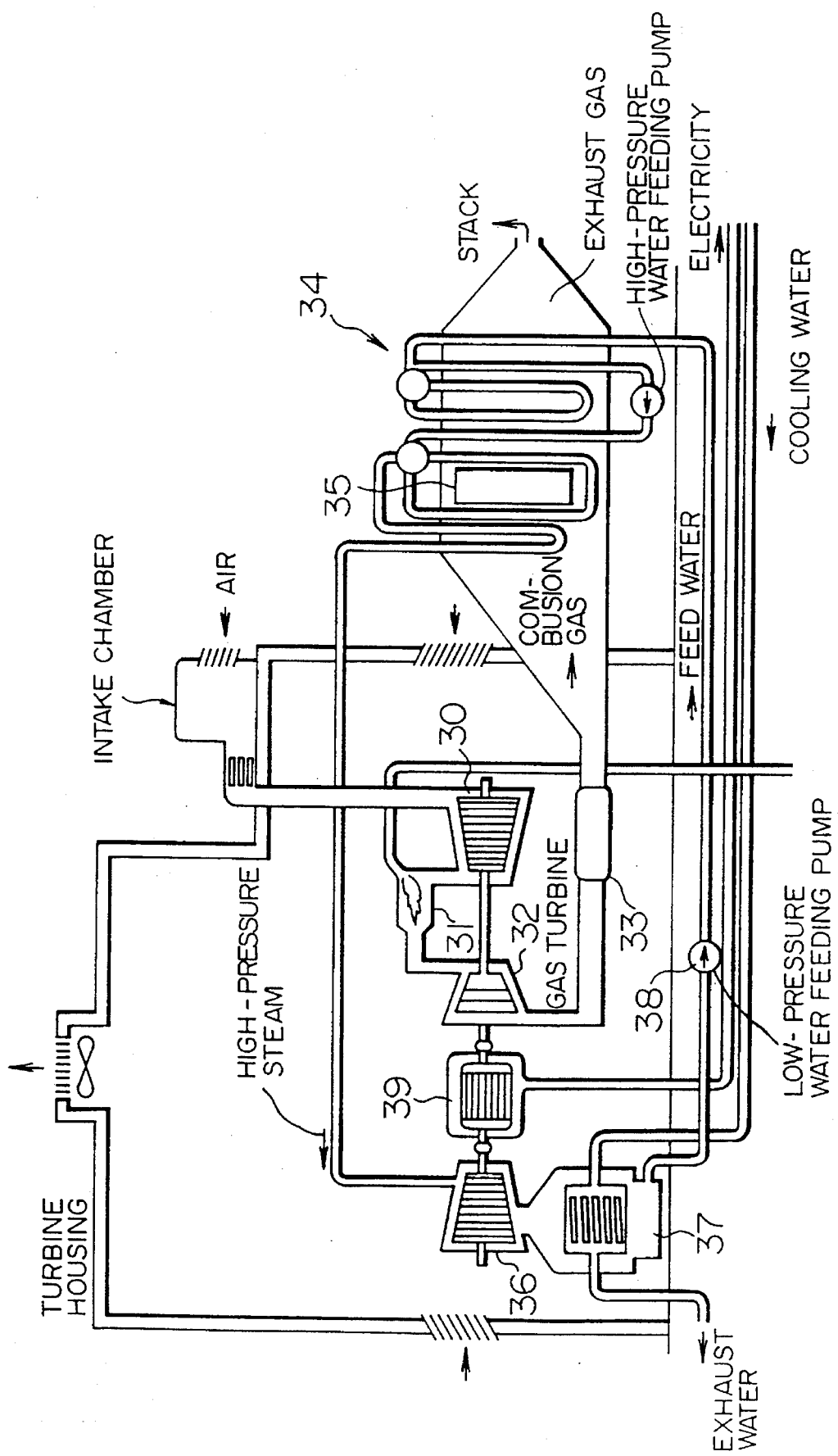

FIG. 10 illustrates the construction of a combined power generating system according to the present invention.

Figure 11:
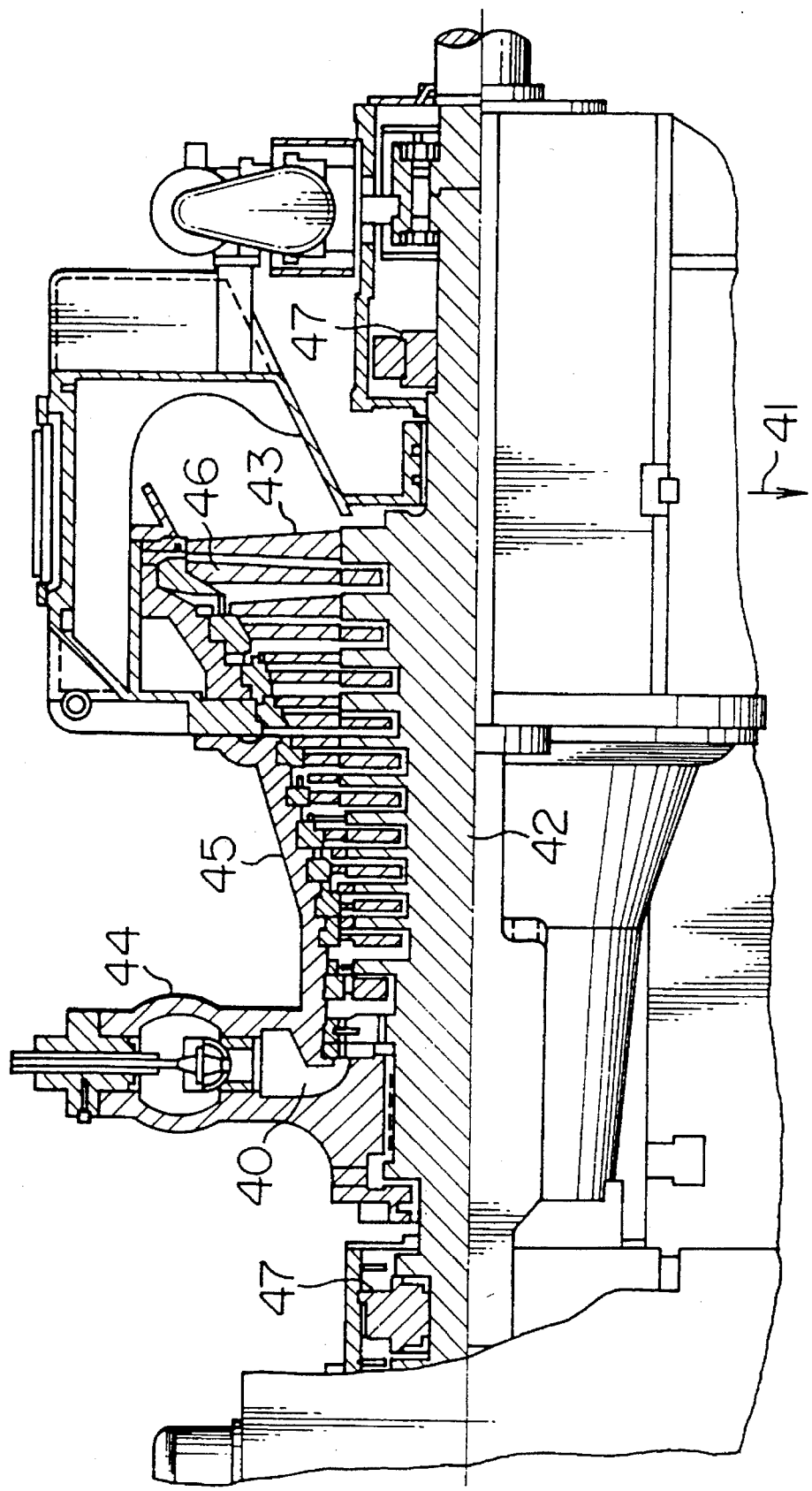

FIG. 11 is a sectional view of steam turbine having a high and low-pressure combined type rotor shaft.

Figure 12:
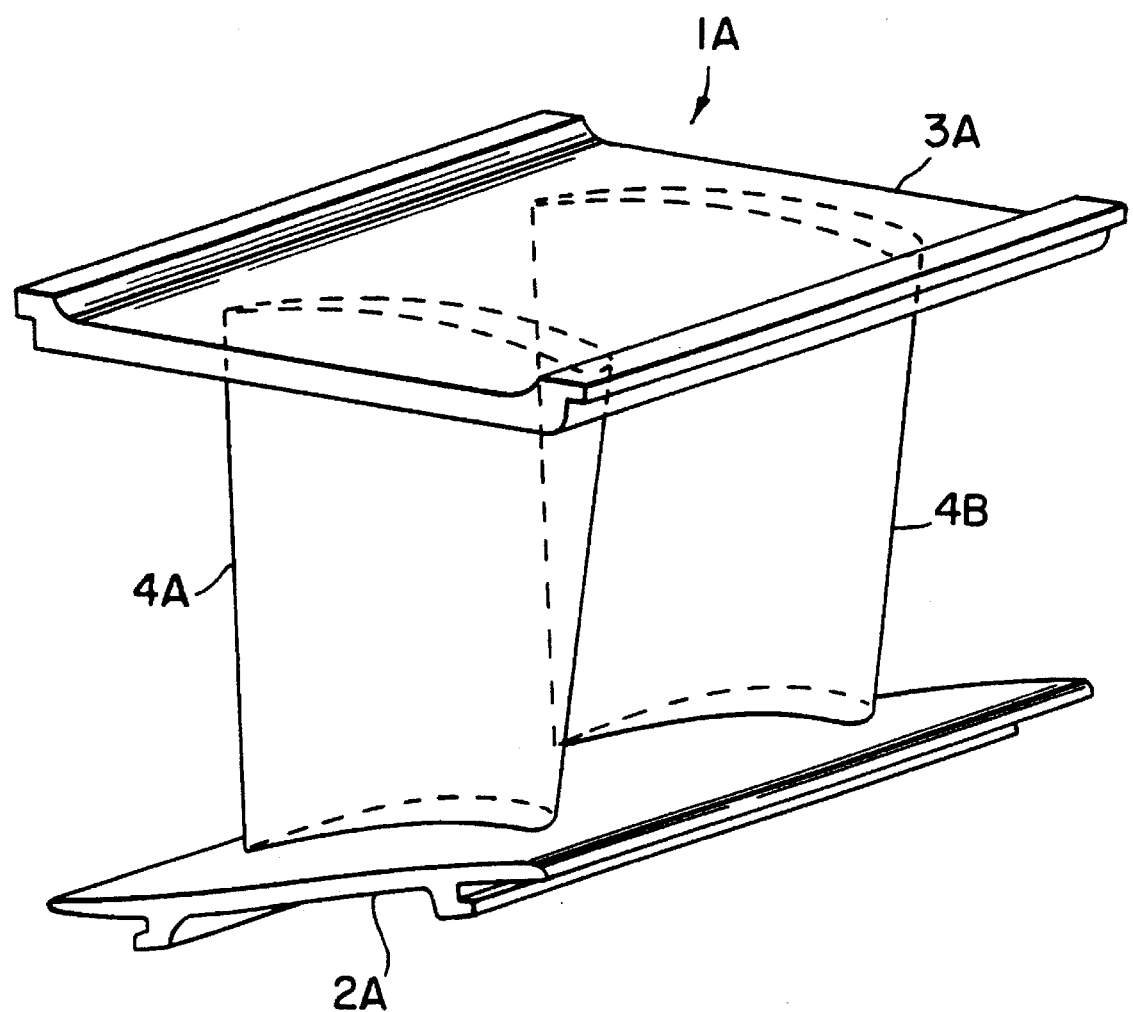

FIG. 12 is a perspective view of another nozzle according to the invention.

DESCRIPTION OF THE PREFERRED EMBODIMENTS

The alloying elements contained in a nickel-base superalloy according to the present invention will be described hereinafter.

Carbon dissolves into matrix and/or precipitates as carbides at grain boundaries as to strengthen these, particularly increases the high-temperature tensile strength, and substantially reduces precipitates of the harmful a phase. However, an excessive amount of contained carbon promotes coarsening of carbides and reduces the strength and toughness at high temperatures over a long term, and weldability of the nickel-base superalloy. An appropriate amount of additive carbon is within a range from 0.05 to 2% by weight, preferably, within a range from 0.08 to 0.16%.

Cobalt dissolves into matrix and increases high-temperature strength and contributes to an increase in corrosion-resistance. However, an excessive cobalt promotes precipitation of harmful intermetallic compounds and reduces high-temperature strength. An appropriate amount of additive cobalt is Within a range from 20 to 25%.

Chromium improves the corrosion resistance, but an excessive chromium promotes precipitation of the harmful a (sigma) phase and coarsening of carbides and reduces high-temperature strength. An appropriate amount of additive chromium is within a range from 15 to 25%, preferably within a range from 20 to 25%.

Aluminum and titanium contribute to increasing high-temperature strength by precipitation of the γ' phase of Ni$_3$(Al, Ti) which is a strengthening factor of nickel-base alloys. However, if aluminum is appropriately added in a range of 1.0 to 3.0%, and titanium 1.5 to 3.0%. Preferably, the amount of [Al+Ti] should range from 3.0 to 5.0%, and the atomic ratio of Ti/Al should range from 0.7 to 1.5.

Niobium, tantalum and hafnium dissolve into γ phase of strengthening factor to increase high-temperature strength of the alloy. However, if excessively added, they cause coarsened carbides to form at grain boundaries, thus reducing strength. [Nb+Ta] are appropriately added in a range of 1.0 to 3.0% and hafnium 0 to 1.5%, preferably, 0.6 to 1.0% Nb and 0.9 to 1.3% Ta.

Zirconium and boron strengthen grain boundaries and increase the high-temperature strength. However, if excessively added, they reduce the ductility, toughness and a-long-term strength. Zirconium is appropriately added in a range of 0 to 0.05%, and boron 0.001 to 0.03%.

Tungsten and molybdenum dissolve into matrix and strengthen the nickel-base superalloy. However, if excessively added, they promote precipitation of harmful phases such as the a phase, thus reducing strength. The appropriate amount of additive [W+Mo] is higher than 5.0% and not higher than 10%. Preferably, the amount of additive tungsten should be within a range from 6.0 to 8.0%.

Rhenium and rare earth elements improve high-temperature corrosion resistance. Such effect reaches a plateau at certain contents, and greater contents promote precipitation of the harmful phases such as a phase, thus reducing the strength. Ranges of appropriate amount to be added are 0 to 2.0% of Re and 0 to 0.5% of at least one of the rare earth elements such as Y or Sc.

Silicon and manganese are used for deoxidation in the conventional art. However, it is not necessary to add Si or Mn in this invention because the alloy is cast by vacuum casting process. If they are added, the amounts of both elements to be added must be 1% or less because greater amounts thereof causes a reduced toughness of the Ni-base superalloy in its use under a high temperature. Preferably, the amounts of these elements should be 0.5% or less, and more preferably, within a range from 0.01 to 0.1%.

The construction of a gas turbine according to the present invention will be described.

At least one final stage member of the discs, distant pieces, turbine spacers, turbine stacking bolts, compressor stacking bolts and compressor discs may be formed of a heat resistant steel which has tempered martensitic structure and consists essentially of, by weight: 0.05 to 0.2% carbon; up to 0.5% Si; up to 1% Mn; 8 to 13% Cr; up to 3% Ni; 1.5 to 3% Mo; 0.05 to 0.3% V; 0.02 to 0.2% Nb; 0.02 to 0.1% nitrogen; and the balance consisting essentially of Fe. All of the above-listed members of all the stages may be formed of the above-described heat resisting steel, so as to achieve an improved heat efficiency. Further, at least one of the above-listed members may be formed of a heat resisting steel which has tempered martensitic structure and consists essentially of, by weight: 0.05 to 0.2% carbon; up to 0.5% Si; up to 0.6% Mn; 8 to 13% Cr; 2 to 3% Ni; 1.5 to 3% Mo; 0.05 to 0.3% V; 0.02 to 0.2% Nb; 0.02 to 0.1% nitrogen; and the balance consisting essentially of Fe, the Mn/Ni ratio being 0.11 or less, preferably within a range from 0.04 to 0.10, so as to achieve a good brittleness-resisting property and thus provide a highly safe gas turbine.

The above-described martensitic steel has a $10^5$ h creep rupture strength at 450° C. of 40 kg/mm$^2$ or higher and a 20° C. V-notch Charpy impact value of 5 kg.m/cm$^2$ or higher. A martensitic steel having a preferable composition has a $10^5$ h creep rupture strength at 450° C. of 50 kg/mm$^2$ or greater, and a 20° C. V-notch Charpy impact value of 5 kg.m/cm$^2$ or higher after heating at 500° C. for $10^5$ hours.

The martensitic steel may further contain at least one of the followings: up to 1% W; up to 0.5% Co; up to 0.5% Cu; up to 0.01% B; up to 0.5% Ti; up to 0.3% Al; up to 0.1% Zr; up to 0.1% Hf; up to 0.01% Ca; up to 0.01% Mg; up to 0.01% Y; and 0.01% one or more rare earth elements.

At least the compressor disc at the final stage or the compressor discs at all the stages may be formed of the above-described heat resisting martensitic steel. However, because the compressor discs at the first to central stages are subjected to relatively low temperatures, these compressor discs may be formed of other materials, and the compressor discs at the central to final stages may be formed of the above heat resistant steel. The compressor discs at the first to central stages, i.e., the upstream compressor discs, may be formed of a Ni-Cr-Mo-V steel which essentially consists of, by weight: 0.15 to 0.30% carbon, up to 0.5% Si; up to 0.6% Mn; 1 to 2% Cr; 2.0 to 4.0% Ni; 0.5 to 1% Mo; 0.05 to 0.2% V; and the balance consisting essentially of Fe, and which has a room-temperature tensile strength of 80 kg/mm$^2$ or higher and a room-temperature V-notch Charpy impact value of 20 kg.m/cm$^2$. The compressor discs downstream from the central stage excepting at least final stage may be formed of a Cr-Mo-V steel which consists essentially of, by weight: 0.2 to 0.4% carbon; 0.1 to 0.5% Si; 0.5 to 1.5% Mn; 0.5 to 1.5% Cr; up to 0.5% Ni; 1.0 to 2.0% Mo; 0.1 to 0.3% V; and the balance consisting essentially of Fe, and which has, at a room temperature, a strength of 80 kg/mm$^2$ or greater, an elongation of 18% or higher and a reduction of area of 50% or higher.

Compressor stub shafts and turbine stub shafts may be formed of the above-described Cr-Mo-V steel.

The compressor discs of the present invention are formed in the shapes of circular discs and have a plurality of holes for stacking bolts in a peripheral portion.

In an example arrangement, the compressor discs of total 17 stages may be formed as follows: the compressor discs at the first to twelve stages are formed of the above-described Ni-Cr-Mo-V steel; the compressor discs at the 13th to 16th stages are formed of the above-described Cr-Mo-V steel; and the compressor disc at the 17th stage is formed of the above-described martensitic steel.

The first-stage compressor disc has less rigidity than the compressor discs at the second and later-stages, and the final-stage compressor disc has a higher rigidity than the other compressor discs. The thicknesses of the compressor discs gradually decrease in the order from the first to the final stages, in order to reduce stress caused by high-speed rotation.

The blades of the compressor should preferably be formed of a martensitic steel consisting essentially of, by weight: 0.07 to 0.15% carbide; up to 0.15% Si; up to 1% Mn; 10 to 13% Cr; and the balance essentially consisting of Fe, and optionally further containing: up to 0.5% Mo; and up to 0.5% Ni.

The first stage portion of shrouds which are formed in the shape of a ring and are slidingly in contact with front end portions of the turbine blades is formed of a cast alloy consisting essentially of, by weight: 0.05 to 0.2% carbon; up to 2% Si; up to 2% Mn; 17 to 27% Cr; up to 5% Co; 5 to 15% Mo; 10 to 30% Fe; up to 5% W; up to 0.02% B; and the balance consisting essentially of Ni. The other portion of the shrouds is formed of a cast alloy consisting essentially of: 0.3 to 0.6% carbon; up to 2% Si; up to 2% Mn; 20 to 27% Cr; 20 to 30% Ni; 0.1 to 0.5% Nb; 0.1 to 0.5% Ti; and the balance consisting essentially of Fe. The shrouds mentioned above are arranged in rings by a plurality of blocks.

The diaphragm for fixing first-stage turbine nozzles in position is formed of an alloy consisting essentially of, by weight: up to 0.05% carbon; up to 1% Si; up to 2% Mn; 16 to 22% Cr; 8 to 15% Ni; and the balance consisting essentially of Fe. Other diaphragm for fixing turbine nozzles at other stages is formed of a casting of high carbon-high nickel steel system.

The turbine blades are formed of a cast alloy consisting essentially of, by weight: 0.07 to 0.25% carbon; up to 1% Si; up to 1% Mn; 12 to 20% Cr; 5 to 15% Co; 1.0 to 5.0% Mo; 1.0 to 5.0% W; 0.005 to 0.03% B; 2.0 to 7.0% Ti; 3.0 to 7.0% Al; at least one of the following, up to 1.5% Nb, 0.01 to 0.5% Zr, 0.01 to 0.5% Hf and 0.01 to 0.5% V; and the balance consisting essentially of Ni, and which has y' and y" phases precipitated in austenitic phase matrix.

At least the first-stage gas turbine nozzles or the gas turbine nozzles of all the stages may be formed of the above-described nickel-base superalloy. The gas turbine nozzles other than the first-stage gas turbine nozzles are formed of a cast alloy consisting essentially of, by weight: 0.20 to 0.60% carbon; up to 2% Si; at most 2% Mn; 25 to 35% Cr; 5 to 15% Ni; 3 to 10% W; 0.003 to 0.03% B and the balance consisting essentially of Ni, which cast alloy may further contain at least one of the followings: 0.1 to 0.3% Ti, 0.1 to 0.5% Nb, and 0.1 to 0.3% Zr, and which has eutectic carbides and secondary carbides in the austenitic phase matrix. Solution-treatment and subsequent aging-treatment are conducted to the alloys so as to form the above-mentioned precipitates, thus being strengthened.

To substantially protect the turbine blades from being corroded by high-temperature combustion gas, the turbine blades may be diffusion-coated with Al, Cr or [Al+Cr]. Preferably, the coating should be made on blade portions thereof which contact the gas, to a thickness within a range from 30 to 150 μm.

A plurality of combustors are provided around the gas turbine. Each combustor has a double-structure composed of an outer casing and an inner casing. The inner casings are made of an alloy consisting essentially of, by weight: 0.05 to 0.2% carbon; up to 2% Si; up to 2% Mn; 20 to 25% Cr; 0.5 to 5% Co; 5 to 15% Mo; 10 to 30% Fe; up to 5% W; up to 0.02% B; and the balance consisting essentially of Ni, and which is solution-treated and has all austenitic structure. The inner casings are formed by welding plastic workings of such an alloy having thicknesses of 2 to 5 mm. Each of the cylindrical inner casing has crescent-shape louver openings which are formed over its entire peripheral surface for supplying air.

A steam turbine of the combined power generating system of the present invention is constructed as below.

The steam turbine of the invention comprises: a rotor which has a rotor shaft rigidly connected to or formed together with the rotor; blades firmly embedded on the rotor shaft in an arrangement of many stages from the high-pressure side to the low-pressure side; and a casing for housing the rotor. The rotor shaft is formed of a Ni-Cr-Mo-V low alloy steel having a bainitic structure so that 11 kg/mm$^2$ or higher of 10$^5$ h creep rupture strength at 538° C. can be achieved.

Preferably, the rotor shaft should be made of a Ni-Cr-Mo-V low alloy steel which has a bainitic structure and comprises, by weight: 0.15 to 0.4% carbon; up to 0.1% Si; 0.05 to 0.25% Mn; 1.5 to 2.5% Ni; 0.8 to 2.5% Cr; 0.8 to 2.5% Mo; and 0.1 to 0.35% V, either the Mn/Ni ratio being not greater than 0.12 or the [Si+Mn]/Ni ratio being not greater than 0.18.

If the rotor shaft formed of the above-described alloy is used in the steam turbine, steam temperatures of 530° C. or higher at the inlet and 100° C. or lower at the outlet can be achieved, and blades longer than 26 inches (preferably, not shorter than 30 inches) can be employed at least at the final stage. Further, in the case where the rotor shaft is made of a Ni-Cr-Mo-V low alloy steel having bainitic structure, and has 11 kg/mm$^2$ or higher (preferably, 12 kg/mm$^2$ or higher) of 10$^5$ hours creep rupture strength at 538° C. of temperature and has a FATT (Fracture Appearance Transition Temperature) at its central portion which is not higher than the above-mentioned steam temperature at the outlet, blades longer than 26 inches (preferably, not shorter than 30 inches) can be employed, being connected into the rotor shaft.

The blades at the low-pressure side have lengths of 30 inches or greater. The blades at the high-pressure side are made of a high chromium martensitic steel which has a higher creep rupture strength than such steel of the low-pressure side blades. The high chromium martensitic steel of the low-pressure side blades has a higher toughness than that of the high-pressure side blades.

The blades having lengths greater than 26 inches are made of a martensitic steel comprising, by weight: 0.08 to 0.15% carbon; up to 0.5% Si; up to 1.5% Mn; 10 to 13% Cr; 1 to 2.5% Mo; 0.2 to 0.5% V; and 0.02 to 0.1% nitrogen. The high-pressure side blades are made of a martensitic steel comprising, by weight: 0.2 to 0.3% carbon; up to 0.5% Si; up to 1% Mn; 10 to 13% Cr; up to 0.5% Ni; 0.5 to 1.5% Mo; 0.5 to 1.5% W; and 0.15 to 0.35% V. The low-pressure side blades having lengths shorter than 26 inches are made of a martensitic steel consisting essentially of, by weight: 0.05 to 0.15% carbon; up to 0.5% Si; up to 1%, preferably 0.2 to 1.0% Mn; 10 to 13% Cr; up to 0.5% Ni; up to 0.5% Mo; and the balance consisting essentially of Fe.

Preferably, the leading edge portions of the blades having lengths of 30 inches or greater should be provided with a layer for protecting from erosion. Specific lengths of the blades may be, for example, 33.5", 40" or 46.5".

The present invention provides a combined power generating system in which one power generator is driven by both the above-described steam turbine and a gas turbine. The steam turbine comprises: a rotor which has a single rotor shaft and blades firmly embedded on the rotor shaft in an arrangement of many stages from the high-pressure side to the low-pressure side; and a casing for housing the rotor. The steam temperature in the steam turbine is 530° C. or higher at the inlet and 100° C. or lower at the outlet. The integrated casing extends from the high-pressure side blades to the low-pressure side blades and has the steam inlet which is formed upstream from the first-stage blade and the steam outlet downstream from the final-stage blade. The low-pressure side blades may have lengths of 30 inches or greater.

Buckets according to the present invention should be preferably made of a tempered all martensitic steel consisting essentially of, by weight: 0.05 to 0.15% carbon; up to 0.5% Si; 0.2 to 1% Mn; 10 to 13% Cr; up to 0.5% Ni; up to 0.5% Mo; and the balance consisting essentially of Fe.

The casing of the present invention should preferably be made of a Cr-Mo-V cast steel which has bainitic structure and comprises, by weight: 0.15 to 0.30% carbon; up to 0.5% Si; up to 1% Mn; 1 to 2% Cr; 0.5 to 1.5% Mo; 0.05 to 0.2% V; and up to 0.05% Ti.

Preferably, an ingot of a Cr-Mo-V steel having the above-described composition should be either electro-remelted or melted in the atmosphere in an arc furnace and then deoxidized by carbon in a vacuum, and the resulting ingot should be hot-forged, heated to the austenitizing temperature, quenched by cooling at a certain rate, and then tempered, so as to obtain a Cr-Mo-V cast steel having bainitic structure as a main structure.

The preferable quenching temperature ranges from 900° to 1,000° C., and the preferable tempering temperature ranges from 630° to 700° C.

Because the steam turbine of the present invention is small and helps increase heat efficiency, it is particularly suitable for medium-size thermal power plants having capacities of 10$^5$ to 3×10$^5$ KW. The steam turbine may have ninety or more longest blades which have lengths of 33.5 inches and are provided circumferentially.

EXAMPLE 1:

Table 1 shows the chemical compositions (weight %) of sample alloys for representative gas turbine nozzles. Ten kilograms of each sample was melted in a high-frequency melting furnace, cast by a lost-wax precision method, heat-treated at 1170° C. for 4 hours, water-cooled, aging-treated by heat-treating at 850° C. for 8 hours. Then, samples were formed by machining. Samples Nos. 1, 2 and 8 through 12 are comparative alloys, and sample Nos. 3 though 7 are alloys of the present invention.

TABLE 1

| | No. | C | Co | Cr | W | Al | Ti | Ta | Nb | B | Ni | Other Elements | Al + Ti |
|---|---|---|---|---|---|---|---|---|---|---|---|---|---|
| C.A. | 1 | 0.15 | 20.0 | 23.0 | 1.98 | 1.85 | 3.65 | 1.38 | 1.98 | 0.010 | Bal. | Zr: 0.11 | 5.50 |
| | 2 | 0.10 | 20.1 | 22.3 | 2.03 | 1.18 | 2.28 | 0.96 | 0.77 | 0.008 | " | | 3.46 |
| Inven- | 3 | 0.13 | 20.3 | 22.3 | 6.98 | 1.55 | 2.73 | 1.13 | 0.88 | 0.007 | " | | 4.28 |
| tion | 4 | 0.10 | 21.5 | 20.2 | 7.55 | 1.18 | 2.32 | 0.98 | 0.78 | 0.007 | " | | 3.50 |
| Alloys | 5 | 0.09 | 21.0 | 19.5 | 5.60 | 1.20 | 2.55 | 1.03 | 0.80 | 0.010 | " | Mo: 1.20 | 3.75 |
| | 6 | 0.10 | 22.3 | 21.8 | 6.23 | 1.33 | 2.19 | 0.99 | 0.61 | 0.009 | " | Zr: 0.03, Hf: 0.22 | 3.52 |
| | 7 | 0.11 | 21.2 | 18.8 | 6.88 | 1.25 | 2.48 | 0.92 | 0.78 | 0.007 | " | Re: 0.3, Y: 0.1 | 3.73 |
| | 8 | 0.11 | 21.3 | 21.0 | 8.30 | 1.23 | 1.61 | 0.99 | 0.86 | 0.006 | " | | 2.84 |
| | 9 | 0.13 | 20.9 | 20.5 | 8.60 | 1.21 | 1.93 | 0.98 | 0.91 | 0.007 | " | | 3.14 |
| | 10 | 0.12 | 21.3 | 22.3 | 7.20 | 1.80 | 2.86 | 1.03 | 0.85 | 0.008 | " | | 4.66 |
| | 11 | 0.10 | 20.6 | 21.5 | 6.05 | 1.91 | 2.66 | 1.02 | 0.79 | 0.008 | " | | 4.57 |
| C.A. | 12 | 0.10 | 21.5 | 20.3 | 6.15 | 0.78 | 1.95 | 0.98 | 0.81 | 0.008 | " | | 2.73 |
| | 13 | 0.11 | 21.5 | 20.3 | 61.5 | 1.19 | 12.5 | 0.97 | 0.80 | 0.007 | " | | 2.44 |
| | 14 | 0.10 | 21.4 | 20.2 | 61.4 | 1.56 | 3.77 | 0.96 | 0.81 | 0.008 | " | | 5.33 |
| | 15 | 0.11 | 21.5 | 20.3 | 4.32 | 1.18 | 2.84 | 0.98 | 0.82 | 0.007 | " | | 4.02 |
| | 16 | 0.10 | 21.3 | 20.1 | 9.55 | 1.17 | 2.83 | 0.97 | 0.81 | 0.008 | " | | 4.00 |
| | 17 | 0.25 | Bal. | 28.6 | 7.11 | — | — | — | — | 0.010 | 10.3 | | — |

"C.A." means comparative alloys.

FIG. 1 indicates the creep rupture strengths at 900° C. of the sample alloys. Sample pieces having 6 mm of a diameter at parallel portions and 30 mm of lengths were used. As indicated in FIG. 1, the invention alloys No. 3 to 6 have improved creep rupture strength at a relatively long time, compared with the comparative alloys No. 2 and 12. The solid-solution strengthening effect by W and/or Mo and the effect of Zr and Hf (No. 6) are significant. The comparative alloy No. 12, having a relatively low tungsten content, showed less improvement.

FIG. 2 shows the relationship between the [Al+Ti] contents and the total length of weld cracks which occurred in a test wherein the sample pieces were pre-heated at 250° C. or lower, and then welded by one-pass TIG at currents of 40 to 80A for 50 seconds, the weld length and width being 80 mm and 8 mm, respectively. Because the alloy No. 14 has a high [Al+Ti] content, i.e., a large amount of y' phase, it is likely to experience weld crackings when cooled after welding. The alloys having relatively low [Al+Ti] contents experienced weld crackings to lesser extents, indicating that good welding can be performed on those alloys if the welding conditions are suitably determined. The result indicates that the [Al+Ti] content should preferably be 5.0% or lower. Tungsten, which enhances strength, caused little improvement in weldability.

Figure 3:
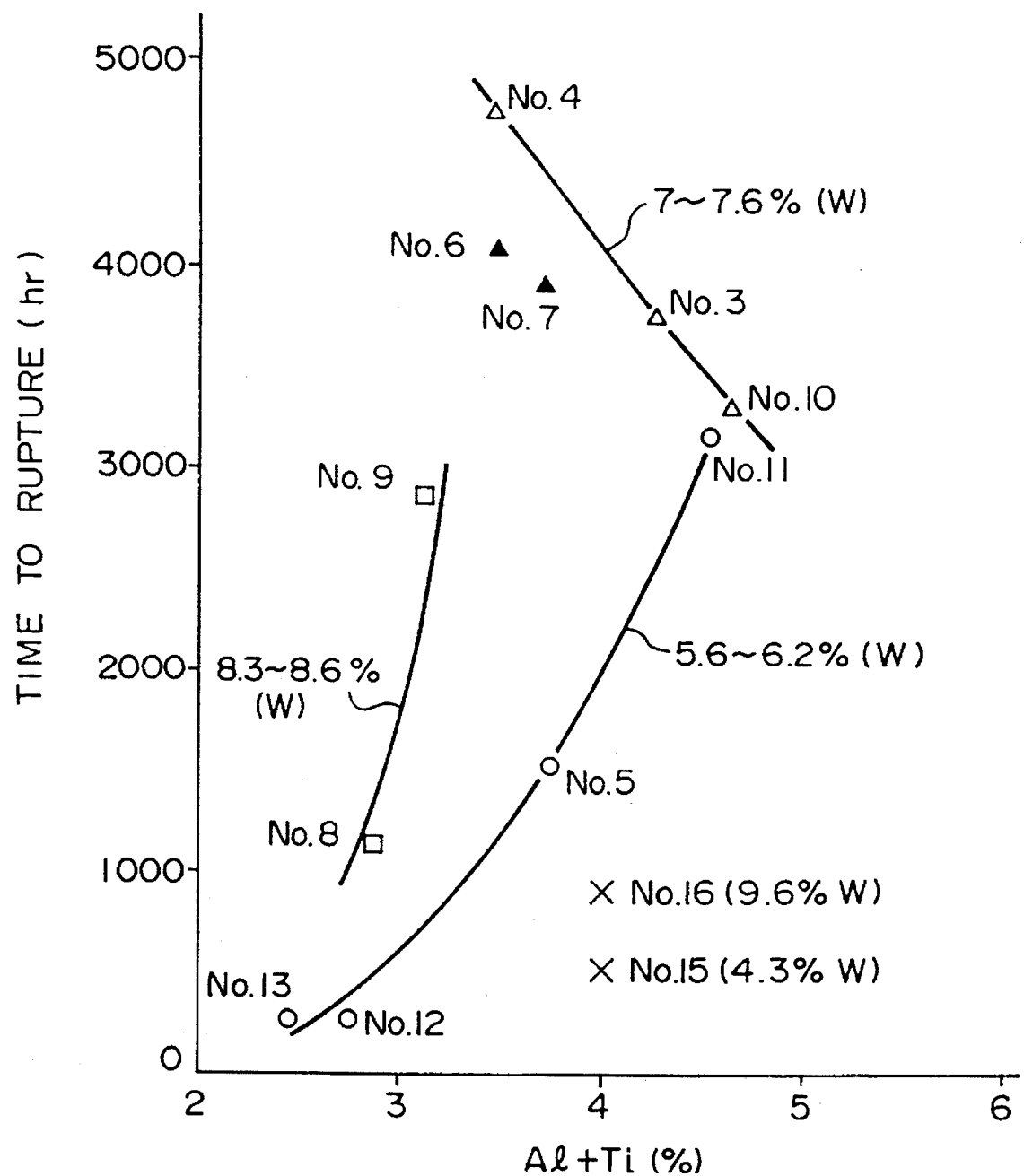
FIG. 3 is a graph indicating the relationships between the amount of [Al+Ti] and the time to creep-rupture at 900° C. and 14 kgf/mm$^2$, with a variety of amount of tungsten.
Figure 4:
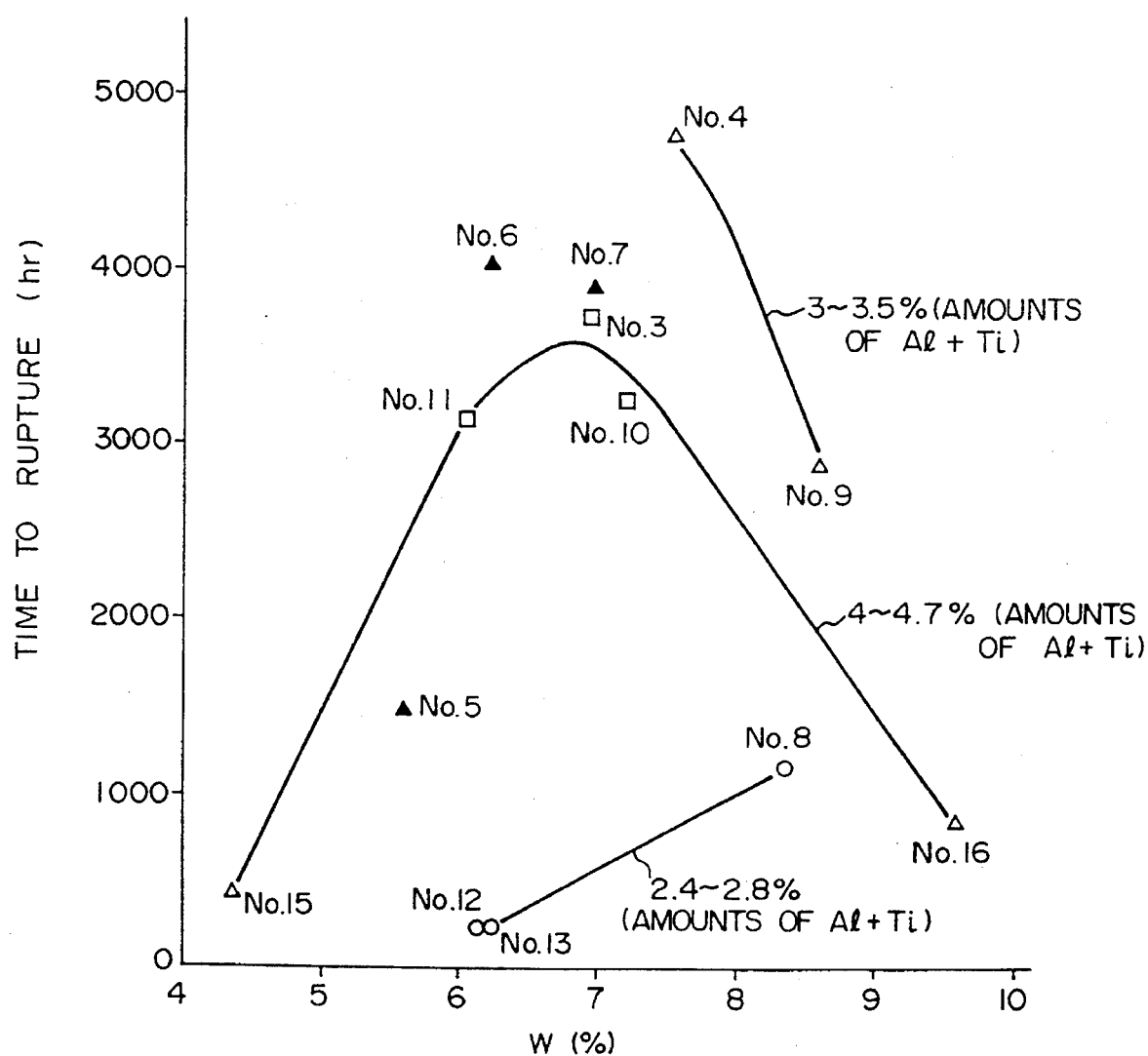
FIG. 4 is a graph indicating the relationships between the amount of tungsten and the time to rupture, with a variety of amounts of [Al+Ti].

FIG. 3 shows the relationship-between the [Al+Ti] contents and the amount of time to rupture in a creep of 14 kgf/mm² at 900° C. As indicated in FIG. 3, strength increases substantially in proportion to Al+Ti] content when the [Al+Ti] content is 2.5% or more. Thus, the result indicates that the [Al+Ti] content of 2.5% or more is necessary. On the other hand, as indicated in FIG. 2, the [Al+Ti] content of 5.0% or more is preferable for satisfactory weldability. If the [Al+Ti] content and the tungsten content are suitably adjusted, the [Al+Ti] content can be reduced to about 2.5% while retaining substantial strength. As shown in FIGS. 3 and 4, the strengthening effect of the [Al+Ti] content significantly varies depending on the tungsten content. With the tungsten content being within a range from about 7 to 9%, the [Al+Ti] content of 2.5% or more substantially increases the strength, and the [Al+Ti] content of 3 to 5% provides an optimal strengthening effect. With the tungsten content within a range from about 5.5 to 7%, the strengthening effect increases with the [Al+Ti] content increasing up to about 5%. Thus, if the tungsten content is suitably controlled, a substantial strength can be obtained without providing a high [Al+Ti] content.

FIG. 4 indicates the relationship between time to creep-rupture and the tungsten content. A large strengthening effect is obtained in a tungsten-content range from 5.5 to 10%. The strengthening effect is particularly large if the [Al+Ti] content is within a range from 3 to 5%. The optimal tungsten-content range is 6 to 8.5%.

FIG. 5 shows the [Al+Ti] contents and the tungsten contents of the sample alloys with the amount of time to rupture shown in parentheses in a creep test performed at 900° C., 12 kgf/mm². The shadowed area indicates content combination wherein: $5<W\leq10$, $2.5\leq[Al+Ti]\leq5.0$, and $[-2.5(Al+Ti)+13.75]<W\leq[-1.25(Al+Ti)+13.75]$. Among the invention alloys shown in the shadowed area, No.3 and No.4 exhibited substantially high strengths. There is a correlation between the tungsten and [Al+Ti] contents with relation to creep rupture strength. Thus, these results indicate that weldability can be improved by reducing the [Al+Ti] content and a strength decrease caused by an [Al+Ti] content decrease can be offset by increasing the tungsten content.

FIG. 6 shows the numbers of heating-cooling cycles before a crack occurred in the samples, one heating-cooling cycle being performed by maintaining the samples at 900° C. for 30 minutes and then cooling to 300° C. The invention alloys exhibited significantly improved heat-fatigue resistances, compared with the comparative alloy No. 17, which is a conventional cobalt-base alloy. Even though the invention alloys are nickel-base alloys, they exhibited higher heat-fatigue resistances than comparative alloys No. 2 and 13, which have relatively low high-temperature strength. This indicates that there is a correlation between heat-fatigue resistance and strength and that the amounts of contained strengthening elements Al, Ti and W are effective.

EXAMPLE 2:

Gas turbine nozzles 1 as shown in FIG. 7 were formed b using alloy No. 7 shown in Table 1. These nozzles (or nozzle elements) 1 are provided in a ring arrangement around rotational blades. A gas turbine nozzle 1 was formed as follows. A wax pattern of the gas turbine nozzle was dipped in a methyl-ethyl-keton solution containing acryl resin. After being dried by ventilation, the wax pattern was dipped in a slurry (zircon flour + colloidal silica + alcohol). Then, stack was sprayed onto the wax pattern. This process was repeated to form many stack layers (the first layer, zircon sand; and the second and subsequent layers, chamotte sand), so as to form a mold. The resultant mold was dewaxed and then fired at 900° C.

This mold was set in a vacuum furnace, and the ingredients of alloy No. 7 were melted in vacuum and poured into the mold. The resultant cast nozzle 1 has inner and outer peripheral sidewalls 2, 3 and a blade portion 4 between the sidewalls. The blade portion 4 has a width of about 74 mm, a length of about 110 mm, the maximum thickness of 25 mm and a wall thickness of 3 to 4 mm. Air passage slits having sizes of about 0.7 mm are formed near the front end of the blade portion.

FIG. 8 is a perspective view of the blade portion 4 partially broken away. The blade portion 4 has a region 5 at which pin-fin cooling is performed, a core plug 6 having openings for impingement cooling and a region 7 having openings for film cooling. The slit portion at the front end has a wall thickness of about 1 mm. Solution-treatment and aging-treatment are conducted to the thus obtained nozzles by heating them in vacuum and cooling then in a heat-treatment furnace filling with non-oxidizing gas such as argon, helium and the like, as described above.

The nozzles of this example are suitable for the first stage and can also be used for the second and third stages. However, the second and third-stage nozzles should preferably be made of cobalt-base alloy and each nozzle should have at least one blade portion, as described below. Though each of the first-stage nozzles is restricted at both sides, each of the second and third-stage nozzles is restricted on one side and has a wider blade portion than a first-stage nozzle.

Especially, each of the nozzles at the second and the third stages may have two to five blade portions. Also in the case where the gas turbine has a larger size, each nozzle may have two or three blade portions. While the nozzles at the second and third stages preferably have the same chemical composition with one another, it may be adjusted that the nozzles at the second stage are formed of a casting nickel-base alloy whose creep rupture temperature at 6 kg/mm$^2$ for 10$^5$ hours is not lower than 800° and the nozzles at the third stage are formed of another casting nickel-base alloy whose creep rupture temperature at 6 kg/mm$^2$ for 10$^5$ hours is not lower than 750° C.

In the case where a high temperature gas turbine in which combustion gas is fed to the nozzles at the first stage in a temperature of 1400° C. at the entrance thereof, it is possible that the nozzles at the first stage are formed of a casting cobalt-base alloy whose creep rupture temperature at 6 kg/mm$^2$ for 10$^5$ hours is not lower than 900° C., the nozzles at the second stage are formed of a casting nickel-base alloy whose creep rupture temperature at 6 kg/mm$^2$ for 10$^5$ hours is not lower than 800° C., and the nozzles at the third stage are formed of another casting nickel-base alloy whose creep rupture temperature at 6 kg/mm$^2$ for 10$^5$ hours is not lower than 750° C.

The core plug 6 having impingement-cooling openings is composed of a duct made of stainless steel JIS SUS304. The entire rims of both ends of the core plug 6 are welded by means of TIG to the outside surfaces of the sidewalls 2 and 3. Because cooling air is introduced through the end opening as shown in FIG. 8, the welded portions must be air-tight. As shown in FIG. 7, film-cooling openings are formed at the inner side in the combustion gas outlet side. The inner peripheral sidewall 2 also has a structure which facilitates cooling in substantially the same way.

Though the first-stage nozzles are each restricted at the outer ends of the two sidewalls, the second and later-stage nozzles are each restricted at one side of the outer-peripheral sidewall.

A nickel-base alloy nozzle of this example has y' phase precipitated in y matrix.

EXAMPLE 3:

FIG. 9 is a partial sectional view of a rotational portion of a gas turbine having gas turbine nozzles in Example 2 according to the present invention.

FIG. 9 shows: a turbine stub shaft 18, turbine buckets 12, a turbine stacking bolt 20, a turbine spacer 25, a distant piece 26, nozzles 27, compressor discs 14, compressor blades 15, compressor stacking bolts 16, a compressor stub shaft 17, turbine discs 13, an opening 19, shrouds 10, a diaphragm 11, combustion ducts 22, compressor stationary blades 23, and compressor duct liner 24. The gas turbine of this example has 17-stage compressor discs 14 and two-stage turbine buckets 12. The turbine buckets 12 may be of three stages. The alloy of the present invention may be used for either type of gas turbine.

A gas turbine of this example is a single-shaft heavy-duty type and comprises: a horizontally-divided casing, a stacking type rotor, a 17-stage axial-flow compressor, a 3-stage impulse turbine, first and second-stage air-cooled nozzles and buckets, and sixteen reverse-flow combustor of slot-cooling type circumferentially arranged.

Steel products having substantially actual dimensions were formed of alloys shown in Table 2 by electro-slag-remelting, forging and heat-treatment. Forging was performed in a temperature range from 850° to 1,150° C., and heat treatment was performed under the conditions shown in Table 2. Table 2 shows the compositions (weight %) of the samples. Sample Nos. 20 to 23 had microscopic structures of tempered all martensitic, and sample Nos. 24 and 25 had microscopic structures of tempered all bainite. Sample No. 20 was used to form a distant piece having thicknesses of 60 mm, a width of 500 mm and a length of 1,000 mm and a final-stage compressor disc having a diameter of 1,000 mm and a thickness of 180 mm. Sample No. 21 was used to form discs having diameters of 1,000 mm and a thickness of 180 mm. No. 22 was used for a spacer having an outside diameter of 1,000 mm, an inside diameter of 400 mm and a thickness of 100 mm. No. 23 was used to form stacking bolts for a turbine and a compressor, the stacking bolts having diameters of 40 mm and lengths of 500 mm. Sample steel No. 23 was also used to form bolts for connecting the distant piece and the compressor discs. Sample Nos. 24 and 25 were elongated by forging into diameters of 250 mm and lengths of 300 mm. Alloy No. 24 was used to form the compressor discs 6 of the 13th to 16th stages. Steel No. 25 was used for the compressor discs 14 of the first to twelfth stages. These discs had the same dimensions as the turbine discs. After heat treatment of the samples, sample pieces were taken from the samples. Sample pieces extending perpendicular to the axes (the lengths) of the samples were taken, except for sample No. 23, from which a sample piece extending along the length was taken.

TABLE 2

| No. | C | Si | Mn | Cr | Ni | Mo | V | Nb | N | Fe | Heat Treatment |
|---|---|---|---|---|---|---|---|---|---|---|---|
| 20 (Distant Piece) | 0.10 | 0.04 | 0.70 | 11.58 | 1.98 | 1.98 | 0.20 | 0.08 | 0.06 | Bal. | 1050° C. × 5 hOQ<br>550° C. × 15 hAC<br>600° C. × 15 hAC |
| 21 (Turbine Disc) | 0.10 | 0.05 | 0.65 | 11.49 | 1.70 | 2.04 | 0.19 | 0.08 | 0.06 | Bal. | 1050° C. × 8 hOQ<br>550° C. × 20 hAC<br>600° C. × 20 hAC |
| 22 (Spacer) | 0.09 | 0.07 | 0.59 | 11.57 | 2.31 | 2.22 | 0.18 | 0.09 | 0.06 | Bal. | 1050° C. × 3 hOQ<br>550° C. × 10 hAC<br>600° C. × 10 hAC |
| 23 (Stacking Bolt) | 0.10 | 0.03 | 0.69 | 11.94 | 1.86 | 2.25 | 0.21 | 0.15 | 0.05 | Bal. | 1050° C. × 1 hOQ<br>550° C. × 2 hAC<br>600° C. × 2 hAC |
| 24 CrMoV steel | 0.26 | 0.25 | 0.79 | 1.09 | 0.41 | 1.25 | 0.23 | — | — | Bal. | 975° C. × 8 hWQ<br>665° C. × 25 hAC<br>665° C. × 25 hAC |
| 25 NiCrMoV steel | 0.20 | 0.21 | 0.36 | 1.51 | 2.78 | 0.62 | 0.10 | — | — | Bal. | 840° C. × 8 hWQ<br>635° C. × 25 hAC<br>635° C. × 25 hAC |

*Bal.: balance, h: hours, OQ: oil quenching, AC: air cooling, WO: water cooling

Table 3 shows the results of the room-temperature extension test, 20° C. V-notch Charpy impact test and creep rupture test of these samples. The 450° C.× $10^5$ h creep rupture strengths were obtained by Larson-Miller parameter method.

TABLE 3

| Nos. | Tensile Strength (kg/mm²) | 0.02% Proof Stress (kg/mm²) | Elongation (%) | Reduction of Area (%) | Impact Values VE$_{20}$ (kg-m/cm²) | $10^5$ h Creep Rupture Strength 450° C. (kg/mm²) |
|---|---|---|---|---|---|---|
| 20 | 112.0 | 79.3 | 19.8 | 60.1 | 8.7 | 51.1 |
| 21 | 111.7 | 79.5 | 20.1 | 59.3 | 8.3 | 52.3 |
| 22 | 114.7 | 81.2 | 19.5 | 62.5 | 7.2 | 51.3 |
| 23 | 115.7 | 82.6 | 22.3 | 63.4 | 8.7 | 52.7 |
| 24 | 86.4 | — | 26.7 | 68.8 | 7.5 | 35.2 |
| 25 | 86.8 | 77.1 | 26.9 | 69.1 | 18.2 | 23 |

Sample Nos. 20 to 23 (12Cr steel) had 450° C.– $10^5$ h creep rupture strengths of 51 kg/mm² or greater and 20° C. V-notch Charpy impact values of 7 kg-m/cm² or greater, proving that they have sufficient strengths as materials for a high-temperature gas turbine.

Sample Nos. 24 and 25 (low alloy steels) used for the stub shafts had low 450° C. creep rupture strengths but substantially high tensile strengths of 86 kg/mm² or higher and 20° C. V-notch Charpy impact values of 7 kg-m/cm² or higher, respectively, proving that they have substantial strengths as materials for the stub shafts (tensile strength < 81 kg/mm², 20° C. V-notch Charpy impact value ≧ 5 kg-m/cm²).

Under these conditions, the temperatures of the distant piece and the final-stage compressor disc reach a maximum of 450° C. Preferably, the thicknesses of the distant piece and the final-stage compressor disc should be within ranges from 25 to 30 mm and from 40 to 70 mm, respectively. The turbine and compressor discs have holes extending entirely through their central portions. Compression remainder stress is created in such holes of the turbine discs.

Further, a gas turbine according to the present invention was constructed by using a turbine spacer 25, a distant piece 26, a final-stage compressor disc 14 all of which are formed of a heat resistant steel as shown in Table 4, and other members formed of the above-described steels. This gas turbine achieved: a compression ratio of 14.7, a temperature of 350° C. or higher, a compression efficiency of 86% or higher, and a gas temperature at the inlets of the first-stage nozzles of 1,200° C. Thereby, a thermal efficiency of 32% or higher was achieved. Further, high creep rupture strength and high impact value after being made brittle by heating were also achieved. Thus, the present invention provides a highly reliable gas turbine.

TABLE 4

| C | Si | Mn | Cr | Ni | Mo | Nb | V | N | Mn/Ni | Fe |
|---|---|---|---|---|---|---|---|---|---|---|
| 0.12 | 0.04 | 0.20 | 11.1 | 2.70 | 2.05 | 0.07 | 0.20 | 0.05 | 0.07 | Bal. |

Gas turbine discs 13 are provided for three stages. The gas turbine of the first and second stages along the gas flow direction have central hole 19. In this example, both gas turbines were formed of the heat resistant steel as shown in Table 4. Further, the heat resistant steel as shown in Table 4 was used to form the compressor disc at the final stage (i.e., the farthest downstream stage), the distant piece 26, the turbine spacer 25, the turbine stacking bolts 20 and compressor stacking bolts 16. Turbine blades 12, turbine nozzles 21, the liner 24 of the combustion duct 22, the compressor blades 15, the compressor nozzles 23, the diaphragm 25 and the shroud 10 were formed of alloys as shown in Table 5. The turbine nozzles 27 and the diaphragm 11 were formed by casting.

In this example, the turbine blade material shown in Table 5 was applied to the moving blades at from the first to the third stages.

In the case of a high temperature gas turbine in which combustion gas is fed to the nozzles at the first stage in a temperature of 1400° C. at the entrance thereof, moving blades at the second and the third stages may be formed of the turbine blade material shown in Table 5. Preferably, the moving blades at the second stage have a creep rupture temperature at 14 kg/mm² for 10⁵ hours is not lower than 800° C. and the moving blades at the third stage have a creep rupture temperature at 14 kg/mm² for 10⁵ hours is not lower than 750° C. It is also preferable that the blades at the first stage are formed of a casting nickel-base alloy of a single crystal structure or a columnar crystal structure being directionally solidified, and that the blades are provided with a diffusion coating layer of any one of Al, Cr and "Al+Cr" for heat interception as aforementioned.

The alloy indicated by segment (1) (in Table 5) of the shroud 10 was used for the first stage-portion thereof, and the alloy indicated by the shroud segment (2) was used for the second and third-stage portions.

EXAMPLE 4:

FIG. 10 schematically illustrates a single-shaft combined-cycle power generating system comprising the gas turbine in Example 3 and a steam turbine.

Increasing numbers of power plants employing gas turbines employ so-called combined power generating systems which use gas turbines and steam turbines to drive the generators, liquefied natural gas (LNG) being used as a fuel to drive the gas turbines and the exhaust gas energy being recovered in the form of steam, which drives the steam turbines. By employing such a combined power generating system, the thermal efficiency can be improved to about 44% from the thermal efficiency of 40% of a conventional system using a steam turbine alone.

Recently, combined power plants which can use not only liquified natural gas but also liquified petroleum gas (LPG) or utilize mixed combustion of LNG and LPG have been developed. Improvements in the smooth operation and economical efficiency of the plants have been thus pursued.

TABLE 5

| | C | Si | Mn | Cr | Ni | Co | Fe | Mo | B | W | Ti | Other Elements |
|---|---|---|---|---|---|---|---|---|---|---|---|---|
| Turbine Blade | 0.15 | 0.11 | 0.12 | 15.00 | Bal. | 9.02 | — | 3.15 | 0.015 | 3.55 | 4.11 | 0.05 Zr, 5.00 Al |
| Turbine Nozzle | 0.43 | 0.75 | 0.66 | 29.16 | 10.18 | Bal. | — | — | 0.010 | 7.11 | 0.23 | 0.21 Nb, 0.15 Zr |
| Combustor Liner | 0.07 | 0.83 | 0.75 | 22.13 | Bal. | 1.57 | 18.47 | 9.12 | 0.008 | 0.78 | — | — |
| Compressor Blade & Nozzle Shroud Segment | 0.11 | 0.41 | 0.61 | 12.07 | 0.31 | — | Bal. | — | — | — | — | — |
| (1) | 0.08 | 0.87 | 0.75 | 22.16 | Bal. | 1.89 | 18.93 | 9.61 | 0.005 | 0.85 | — | — |
| (2) | 0.41 | 0.65 | 1.00 | 23.55 | 25.63 | — | Bal. | — | — | — | 0.25 | 0.33 Nb |
| Diaphragm | 0.025 | 0.81 | 1.79 | 19.85 | 11.00 | — | Bal. | — | — | — | — | — |

"Bal." means balance.

The liner, buckets and stationary blades are provided with heat-blocking coating layers on surface areas which will be in contact with flames. The heat-blocking coating layers are formed by thermal-spraying $Y_2O_3$-stabilized zirconia. Between the base metals and the coating layers, alloy layers are provided which are composed of: 2 to 5% Al, 20 to 30% Cr, 0.1 to 1% Y, and the balance of Ni or [Ni+Co].

In such a construction, the gas turbine of this example achieves: a compression ratio of 14.7, a temperature of 350° C. or higher, a compression efficiency of 86% or higher, a gas temperature at the inlets of the first-stage turbine nozzles of 1,260° C., and an exhaust temperature of 530° C. As a result, a heat efficiency of 32% or higher can be obtained. Further, the turbine discs, the distant piece, the spacers, the final-stage compressor disc and the stacking bolts of the gas turbine of this example are made of the above-described heat resistant steels having high creep rupture strengths and high heat-brittleness resistance. Still further, the turbine blades are made of an alloy having a high high-temperature strength, the turbine nozzles are made of an alloy having high high-temperature strength and high-temperature ductility, and the combustor liner is made of an alloy having high high-temperature strength and anti-fatigue strength. All the above features provide the gas turbine with high overall reliability.

Natural gas or light oil may be used as the fuel. Although most gas turbines employ intercoolers, the gas turbine nozzles of the present invention are suitable for a gas turbine having no intercooler because the nozzles of such a gas turbine are subject to relatively high temperatures. According to this examples, forty turbine nozzles are provided all around the first stage.

Referring to FIG. 10, air is introduced through an intake filter and an intake silencer into an air compressor 30 of a gas turbine 32. The air compressor 30 compresses the air and sends the compressed air to a low-$NO_x$ combustor 31.

In the combustor, the fuel is injected into the compressed air for combustion, which forms high-temperature gas. The resulting high-temperature gas performs work to the turbine, thus generating power.

The exhaust gas from the turbine has a temperature of 500° C. or higher and is sent through an exhaust silencer means 33 into a waste-heat recovering boiler 34, in which the thermal energy of the turbine exhaust gas is recovered in the form of high-pressure steam having a temperature of 500° C. or higher. This boiler has a denigrator means of selective catalytic reduction method with dry ammonium. The exhaust gas is let out through a tripod assembly type stack as high as several hundred meters.

The high and low-pressure steam is sent to a steam turbine 36 having a high and low-pressure combined type rotor. This steam turbine will be described below.

The steam from the steam turbine flows into a condenser 37, in which the steam is vacuum-desired to become condensate (water). The condensate is pressured by a low-pressure water-feeding pump 38 to become feedwater, which is then sent to the waste-heat recovering boiler 34. The gas turbine and the steam turbine are connected to the respective ends of the shaft of a generator 39, thus each driving the generator 9 to generate electricity. In this type of combined generating system, the steam used by the steam turbine may also be used as a coolant to cool the gas turbine blades. Although air is generally used as a coolant for the blades, steam has a greater cooling effect because steam has a much greater specific heat than air and yet fairly low weight. However, since steam has a large specific heat, the thermal efficiency of the entire system will be reduced if the steam used for cooling is directly released into the mainstream gas, causing a significant decrease in the mainstream gas temperature. Therefore, relatively low-temperature steam (e.g., having a temperature of about 800° C.) is introduced through a coolant-introducing opening to gas turbine blades so as to cool the blades, and the coolant (steam) which is heated, e.g., to about 900° C., by the heat exchange with the blades is recovered and sent back to the steam turbine. In this way, reduction of the mainstream gas temperature (about 1,300° to 1,500° C.) can be mitigated, and thus, the thermal efficiency of the steam turbine and the entire plant can be improved. In the combined-type generating system of this example, the gas turbine and the steam turbine can provide electricity of about 40,000 KW and 60,000 KW, respectively, thus providing about $10^5$ KW in total. Because the steam turbine of this example can be built in a compact size, the production cost per unit of generated electricity can be reduced from such production cost for a large-size steam turbine, and further, it can be economically operated in response to changes in the amount of required power generation.

In the gas turbine 32, the air compressed by the compressor 30 is sent to the combustor 31, in which combustion is performed at a combustion gas temperature of 1,100° C. or higher. The resulting combustion gas rotates the discs by striking the blades connected into the discs.

FIG. 11 is a partial sectional view of a high and low-pressure combined steam turbine according to the present invention. In a conventional steam turbine, one turbine rotor consumes steam of which high-pressure and high-temperature steam conditions at the main steam inlet are 80 atg and 480° C. and low-pressure and low-temperature steam conditions at the exhaust portion are 722 mmHg and 33° C., while, in the high and low-pressure combined steam turbine of the invention, the steam temperature and pressure at the main steam inlet are increased to 100 atg and the 538° C. Thereby, the output of a turbine can be increased. In addition, to increase the output of a turbine, the lengths of the final-stage buckets must be increased so as to increase steam flow. For example, if the lengths of the final-stage buckets are increased from conventional 26 inches to 33.5 inches, the ring belt area is increased to about 1.7 times, thus increasing the output of a turbine from a conventional 100 MW to 170 MW. If the lengths are increased to 40 inches, the output is more than doubled.

If a high and low-pressure combined rotor comprising blades having lengths of 33.5 inches or greater is formed of a Cr-Mo-V steel containing 0.5% Ni, which has a high high-temperature strength and a good creep characteristic and has been used for the high-temperature portions, such rotor has a sufficient durability in the high-pressure and high-temperature conditions at the main steam inlet. However, low-temperature regions of the rotor, particularly, the turbine rotor central hole at the final-stage bucket portion, experience substantially large tangential stresses. While the tangential-stress ratio (acting stress/tolerable stress) at the turbine rotor central hole at the final-stage bucket portion having 26-inch blades is about 0.95, such a ratio in the case of 33.5-inch blades is about 1.1, proving that such a rotor is not usable.

If a high and low-pressure combined rotor comprising blades having lengths of 33.5 inches or greater is formed of a 3.5%Ni-Cr-Mo-V steel, which has a substantial toughness in a low temperature range and has tensile strength and proof stress in a low temperature range 14% greater than those of a Cr-Mo-V steel, the above-mentioned stress ratio is about 0.96. If 40-inch blades are employed, the stress ratio is 1.07, proving that such a construction is not practical. In a high temperature range, the creep rupture strength of the 3.5%Ni-Cr-Mo-V steel is about 0.3 time that of the Cr-Mo-V steel, proving that the 3.5%Ni-Cr-Mo-V steel has an insufficient high-temperature strength and is not usable.

Therefore, a rotor material having the good properties of the Cr-Mo-V steel in a high temperature range and the good properties of the Ni-Cr-Mo-V steel in a low temperature range is required in order to achieve a high output of a turbine.

If about 30 to 40-inch blades are employed, a rotor material having a tensile strength of 88 kg/mm² or greater is required because the use of a conventional Ni-Cr-Mo-V steel (ASTMA 470 class 7) results in the stress ratio of 1.07 as described above.

Further, the material for a high and low-pressure combined steam turbine rotor into which long blades having lengths of 30 inches or greater are connected must have a 538° C.×$10^5$ h creep rupture strength of 15 kg/mm² or greater in order to provide sufficient resistance for high-temperature rupture at the high-pressure side. The material must also have a room-temperature impact absorbing energy of 2.5 kg-m (3 kg-m/cm²) in order to provide sufficient resistance for brittle rupture at the low-pressure side.

A heat resistant steel according to the present invention achieves the above-described required properties. Thereby, the output of a turbine can be increased.

Referring to FIG. 11, a steam turbine according to the present invention has a high and low-pressure combined rotor shaft 42 into which blades 43 of thirteen stages are connected. Steam flows through a steam control valve 44 and a steam inlet 40 into the turbine. The steam at the inlet has a temperature of 538° C. and a pressure of 88 atg, as described above. Steam flows one way to the final-stage blades, the steam temperature and pressure decreasing to 33° C. and 722 mmHg. Steam is let out from an outlet 41. Since the high and low-pressure combined rotor shaft is subject to a wide temperature range from 538° C. to 33° C., it must be formed of a Ni-Cr-Mo-V low alloy steel having the above-mentioned required properties. Portions of the rotor shaft 42 into which the blades 43 are connected are formed in the shapes of discs. Such disc-shape portions are formed together with the rotor shaft by cutting. The lengths of the disc portions vary, and shorter blades connected into longer disc portions, thus mitigating vibrations. FIG. 11 further shows a casing 45, stationary blades 46 and bearings 47.

TABLE 6

| C | Si | Mn | P | S | Ni | Cr | Mo | V | Fe |
|---|----|----|----|---|----|----|----|---|-----|
| 0.23 | 0.04 | 0.10 | 0.008 | 0.010 | 1.61 | 1.24 | 1.38 | 0.25 | Bal. |

To form the rotor shaft 42 of the invention, a forged product having a composition shown in Table 6 was electroslag-remelted and forged into a shaft material having a diameter of 1.2 m. The shaft material was maintained at 950° C. for 10 hours, and then it was cooled by water spraying so that 100° C./h in a central portion was obtained while the shaft was being rotated. Subsequently, the shaft was tempered by heating and maintaining it at 665° C. for 40 hours. Sample pieces were cut out from a central portion of this rotor shaft. Using the sample pieces, creep rupture tests, V-notch impact tests (using sample pieces having areas of 0.8 cm²) before and after heat treatment (500° C. for 3,000 hours) and tensile tests were performed.

Various members of the system of Example 4 have compositions as follows.

(1) Blades

The blades of the three stages toward the high-temperature and high-pressure end have lengths of about 40 mm and are formed by forging a martensitic steel consisting essentially of, by weight: 0.20 to 0.3 carbon; 10 to 13% Cr; 0.5 to 1.5% Mo; 0.5 to 1.5% W; 0.1 to 0.3% V; up to 0.5% Si; up to 1% Mn; and the balance consisting of Fe.

The lengths of the blades of the medium-pressure region gradually increase toward the low-pressure side. The blades of the medium-pressure region are formed by forging a martensitic steel consisting essentially of, by weight: 0.05 to 0.15% carbon; up to 1% Mn; up to 0.5% Si; 10 to 13% Cr; up to 0.5% Mo; up to 0.5% Ni; and the balance consisting of Fe.

About ninety blades having length of 33.5 inches are provided all around the final stage and formed by forging a martensitic steel consisting essentially of, by weight: 0.08 to 0.15% carbon, up to 1% Mn; up to 0.5% Si; 10 to 13% Cr; 1.5 to 3.5% Ni; 1 to 2% Mo; 0.2 to 0.5% V; 0.02 to 0.08% nitrogen; and the balance consisting of Fe. Stelite shielding plates for erosion protection are attached by welding to the leading edge portions of these final-stage blades. Further, the final-stage blades are partially quenched. Blades longer than 40 inches are formed of a titanium steel containing 5 to 7% Al and 3 to 5% V. The blades of each stage are connected to four or five shroud plates which are made of the same material and connected to one another by caulking protruding tenons formed on their edge portions.

For an operation of 3,000 rpm, 40-inch blades are formed of the above-described 12% chromium steel. For an operation of 3,600 rpm, the 40-inch blades are formed of a titanium steel while 33.5-inch blades are formed of a 12% chromium steel.

(2) Stationary Blades

The stationary blades 46 of the three stages toward the high-pressure end are formed of the same martensitic steel as used for the blades of the same three stages. The other stationary blades 46 are formed of the same martensitic steel as is used for the blades of the medium-pressure region.

(3) Casing

The casing 45 is formed of a Cr-Mo-V steel comprising, by weight: 0.15 to 0.3% carbon; up to 0.5% Si; up to 1% Mn; 1 to 2% Cr; 0.5 to 1.5% Mo; 0.05 to 0.2% V; and up to 0.1% Ti.

A generator 39 has a generation capacity of $10^5$ to $2 \times 10^5$ KW. As for the rotor shaft of the present invention: the distance between the bearings 47 of the rotor shaft is about 520 cm; the outside diameter of the rotor at the final-stage blades is 316 cm; and the intershaft ratio to this outside diameter is 1.65. This rotor shaft can achieve a generation capacity of $10^5$ KW. The distance between the bearings per a generation output of $10^5$ KW is 0.52 m.

The ratios of the length of a final-stage blade to the outside diameter of a blade-connecting portion of the rotor shaft are: a 33.5-inch blade, 1.70; and a 40-inch blade, 1.17.

The system of this example can also be used at a steam temperature of 566° C. and a pressure of 121, 169 or 224 atg.

The power plant was composed of six power generating systems each of which comprised a gas turbine, a waste-heat recovering boiler, a steam turbine and a generator.

In the gas turbine, LNG was burned in compressed air to obtain high-temperature combustion gas, which rotates the turbine directly connected to the generator.

In the waste-heat recovering boiler, thermal energy of the combustion gas from the gas turbine was recovered in the form of steam, which was conducted to the steam turbine directly connected to the generator.

The gas turbine generated about ⅔ of the total power generation, and the steam turbine generated the rest of the power.

The above-described combined generating system achieved the following advantages.

Heat efficiency can be improved by 2 to 3%, compared with a conventional thermal power plant. Further, because a partial-load operation can be performed by operating a reduced number of running gas turbines approximately at the rated load, which provides a high heat efficiency, the heat efficiency of the entire plant can be maintained at a high level.

In addition, because a combined generating system comprises a gas turbine which can be easily and quickly started and stopped and a small steam turbine having a relatively simple structure, output adjustment is easy. As a result, the combined system of the invention can be suitably used as a medium-load thermal power plant which can quickly respond to changes in the amount of required power generation.

Because the reliability of gas turbines has been significantly improved due to recent advances in technology, the system of the invention provides high reliability. Further, because the combined power plant has a system composed of gas and steam turbine of relatively small capacities, any trouble which may happen can be locally confined.

Because the output that the steam gas turbine provides is small, i.e., about one third of the output of the entire plant, the amount of the hot waste water is reduced to about 70% of that of a conventional steam turbine having the equivalent capacity.

Referring to FIG. 12, a gas turbine nozzle 1A was formed from No. 9 alloy of Example 1 in Table 1 by substantially the same manner as that in Example 2, which is applied to the second and/or the third stage which is located at the downstream side of the combustion gas flow mentioned in Example 3. The nozzle 1A has two blade portions (or sections) 4A, 4B between side walls 2A and 3A, and greater widths between the two side walls and a greater longitudinal length of the blade portions 4A, 4B respectively, than that of the nozzle in Example 2. With regard to the width length of the respective blade portions 4A, 4B, it increases from the upstream side toward the downstream side with respect to combustion gas flow. Each nozzle at the third stage has larger widths and longitudinal lengths of blade portions than those of each nozzle at the second stage. Nozzles at the first stage are formed of the turbine nozzle material shown in Table 5, and those surfaces of blade portions thereof, which are exposed to combustion gas, are respectively provided with a coating for heat interception consisting of a stabilized $ZrO_2$.

As described above, the present invention provides a Ni-base superalloy which has a greater heat-fatigue resistance than a conventional Co-base alloy, a greater long-period strength and a better weldability than a convention Ni-alloy.

The nickel-base superalloy of the invention is suitable for the material of gas turbine nozzles which must have high reliability to be used in a gas turbine which is operated at increased temperatures. The gas turbine employing such gas turbine nozzles increases the reliability of the combined generating system.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims.

We claim:

1. A gas turbine comprising:

a compressor for compressing air;

a plurality of nozzles for directing combustion gas;

a turbine rotor; and a plurality of moving blades which are connected in said turbine rotor, said nozzles being provided in a ring-arrangement opposite to said moving blades, at least one nozzle having two side walls and at least one blade portion formed between said two side walls, and being formed of a nickel-base superalloy consisting essentially of, by weight: 0.05 to 0.20% carbon, 15 to 25% Co, 15 to 25% Cr, 1.0 to 3.0% Al, 1.0 to 3.0% Ti, 1.0 to 3.0% Nb, 5 to 10% W, and at least 42.5% Ni, the combination of (Al+Ti) content and the tungsten content being determined within a pentagonal shadowed area including the boundary shown in FIG. 5, five vertices of which are: A(2.5% of (Al+Ti), 10% W), L(5% of (Al+Ti), 10% W), D(5% of (Al+Ti), 5% W), E(3.5% of (Al+Ti),5% W), and F(2.5% of (Al+Ti), 7.5% W).

2. A gas turbine comprising:

a compressor for compressing air;

a plurality of nozzles for directing combustion gas;

a turbine rotor; and a plurality of moving blades which are connected in said turbine rotor;

said nozzles being provided in a ring-arrangement opposite to said moving blades, and being formed of a nickel-base superalloy which remains intact in a 900° C.-14 kg/mm² rupture test for 300 hours or longer, and which does not substantially cause a cracking in welding beads 80 mm long formed by one-pass TIG-welding, each said nozzle having two side walls and at least one blade portion formed between said two side walls and being of a casting of said nickel-base superalloy, and said blade portion having a dimension between said side walls of 70 mm or greater and a dimension between its inlet-side end and its outlet-side end of 100 mm or greater.

3. A gas turbine comprising:

a compressor for compressing air;

a plurality of nozzles for directing combustion gas a turbine rotor; and a plurality of moving blades which are connected in said turbine rotor;

said nozzles being provided in a ring-arrangement opposite to said moving blades, said nozzles each having at least one blade portion formed between two side walls, and being formed of a nickel-base superalloy consisting essentially of, by weight: 0.05 to 0.20% carbon; 15 to 25% Co; 15 to 25% Cr; 1.0 to 3.0% Al, 1.0 to 3.0% Ti; 1.0 to 3.0% Nb; 5 to 10% W; and the balance consisting essentially of Ni, the combination of the (Al+Ti) content and the tungsten content being determined within a pentagonal shadowed area including the boundary shown in FIG. 5, five vertices of which are: A(2.5% of (Al+Ti), 10% W), L(5% of (Al+Ti), 10% W), D(5% of (Al+Ti), 5% W), E(3.5% of (Al+Ti), 5% W), and F(2.5% of (Al+Ti), 7.5% W).

4. A gas turbine comprising:

a compressor for compressing air;

a plurality of nozzles for directing combustion gas;

a turbine rotor; and a plurality of moving blades which are connected in said turbine rotor;

said nozzles being provided in a ring-arrangement opposite said blades, said nozzles having at least one blade portion formed between said two side walls and being formed of a nickel-base superalloy of, by weight: 0.05 to 0.20% carbon; 15 to 25% Co; 15 to 25% Cr; 1.0 to 3.0% Al, 1.0 to 3.0% Ti; 1.0 to 3.0% Nb; 5 to 10% W; at least one of up to 0.05% Zr, 0.001 to 0.03% B, up to 1.5% Hf, up to 2% Re, up to 0.5% Y, up to 0.5% Sc, up to 5% Mo and up to 0.5% one or more rare earth elements; and the balance consisting essentially of Ni, the combination of the (Al+Ti) content and the tungsten content being determined within a pentagonal shadowed area including the boundary shown in FIG. 5, five vertices of which are: A(2.5% of (Al+Ti), 10% W), L(5% of (Al+Ti), 10% W), D(5% of (Al+Ti), 5% W), E(3.5% of (Al+Ti), 5% W), and F(2.5% of (Al+Ti), 7.5% W).

5. A gas turbine comprising:

a compressor for compressing air;

a plurality of nozzles for directing combustion gas;

a turbine rotor;

a plurality of moving blades of three or more stages which are connected in said turbine rotor;

said nozzles of three or more stages being provided in a ring-arrangement opposite to said moving blades of three or more stages and each nozzle having two side walls and at least one blade portion formed between said two side walls, the first-stage nozzles the most upstream disc, being a casting of a nickel-base superalloy, comprising, by weight: 0.05 to 0.20% carbon, 20 to 25% Co, 15 to 25% Cr, 1.0 to 3.0% Al, 1.0 to 3.0% Ti, 1.0 to 3.0% Nb, 5 to 10% W, and at least 42.5% Ni, said casting remaining intact in a 900° C.-14 kg/mm² rupture test for 300 hours or longer, the second and latter-stage nozzles being formed of a Co-base alloy comprising, by weight; 0.2 to 0.6% carbon, up to 2% Si, up to 2% Mn, 25 to 35% Cr, 5 to 15% Ni, 3 to 10% W, 0.003 to 0.03% B, and at least 50% Co.

6. A gas turbine nozzle formed of a nickel-base superalloy consisting essentially of, by weight: 0.05 to 0.20% carbon, 20 to 25% Co, 15 to 25% Cr, 1.0 to 3.0% Al, 1.0 to 3.0% Ti, 1.0 to 3.0% Nb, 5 to 10% (W+Mo), at least one of up to 0.05% Zr, up to 0.03% B, up to 1.5% Hf, up to 2% Re, up to 2% V, up to 0.5% Y, up to 0.5% Sc and up to 0.5% one or more rare earth elements and at least 42.5% Ni, the combination of the (Al+Ti) content and the tungsten content being determined within a pentagonal shadowed area including the boundary shown in FIG. 5, five vertices of which are: A(2.5% of (Al+Ti), 10% W), L(5% of (Al+Ti), 10% W), D(5% of (Al+Ti), 5% W), E(3.5% of (Al+Ti), 5% W), and F(2.5% of (Al+Ti), 7.5% W).

7. A gas turbine nozzle comprising: two side walls and at least one blade portion formed between said two side walls, and being formed of a nickel-base superalloy consisting essentially of, by weight: 0.05 to 0.20% carbon, 20 to 25% Co; 15 to 25% Cr; 1.0 to 3.0% Al; 1.0 to 3.0% Ti; 1.0 to 3.0% Nb; 5 to 10% (W+Mo); at least one of up to 0.05% Zr, 0.001 to 0.03% B, up to 1.5% Hf, up to 2% Re, up to 2% V, up to 0.5% Y, up to 0.5% Sc and up to 0.5 % one or more rare earth elements; and at least 42.5% Ni, the combination of the (Al+Ti) content and the tungsten content being determined within a pentagonal shadowed area including the boundary shown in FIG. 5, five vertices of which are: A(2.5% of (Al+Ti), 10% W) , L(5% of (Al+Ti), 10% W), D(5% of (Al+Ti), 5% W), E(3.5% of (Al+Ti), 5% W), and F(2.5% of (Al+Ti), 7.5% W) .

8. A nickel-base superalloy consisting essentially of, by weight: 0.05 to 0.20% carbon, 20 to 25% Co; 15 to 25% Cr; 1.0 to 3.0% Al; 1.0 to 3.0% Ti; 1.0 to 3.0% Nb; 5 to 10% (W+Mo); and at least 42.5% Ni, the combination of the (Al+Ti) content and the tungsten content being determined with a tetragonal shadowed area including the boundary shown in FIG. 5, four vertices of which are: M(3.14% of (Al+Ti), 8.6% W), N(4.7% of (Al+Ti), 8.6% W), 0(4.7% of (Al+Ti), 6.05% W), and P(3.14% (Al+Ti), 6.05% of W).

9. A nickel-base superalloy consisting essentially of, by weight: 0.05 to 0.20% ca bon, 20 to 25% Co, 15 to 25% Cr, 1.0 to 3.0% Al, 1.0 to 3.0% Ti, 1.0 to 3.0% Nb, 5 to 10% (W+Mo), and at least one of up to 0.05% Zr, 0.001 to 0.03% B, up to 1.5% Hf, up to 2% Re, up to 2% V, up to 0.5% Y, up to 0.5% Sc and 0.5% one or more of rare earth elements; and at least 42.5% Ni, the combination of the (Al+Ti) content and the tungsten content being determined with in a tetragonal shadowed area including the boundary shown in FIG. 5, four vertices of which are: M(3.14% of (Al+Ti), 8.6% W), N(4.7% of (Al+Ti), 8.6% W), 0(4.7% of (Al+Ti), 6.05% W), and P(3.14% (Al+Ti), 6.05% of W).

10. A combined power generating system having a total heat efficiency of 44% or higher and comprising:

a gas turbine driven by combustion gas which flows at high speeds;

a waste-heat recovering boiler for recovering energy of exhaust gas of said gas turbine in the form of steam; a steam turbine driven by the steam provided by said waste-heat recovering boiler; and a generator driven by said gas turbine and said steam turbine, wherein said gas turbine has moving blades at three or more stages, and a plurality of nozzles each having two side walls and at least two blade portions formed between said two side walls, said blade portion having a dimension between its inlet-side end and a dimension between its inlet-side end and greater and the combustion gas temperature at an inlet of said gas turbine is 1260° C. or higher and the exhaust gas temperature at an outlet is 530° C. or higher, said waste-heat recovering boiler provides steam having a temperature of 530° C. or higher, and wherein said steam turbine comprises: a high and low-pressure combined-type rotor formed of a Ni-Cr-Mo-V low alloy steel having a bainitic structure; blades, at the final stage longer than 26 inches; and a casing containing said steam turbine.

11. A combined power generating system having a total heat efficiency of 44% or higher and comprising:

a gas turbine driven by combustion gas which flows at high speeds;

a waste-heat recovering boiler for recovering energy of exhaust gas of said gas turbine in the form of steam; a steam turbine driven by the steam provided by said waste-heat recovering boiler; and a generator driven by said gas turbine and said steam turbine, wherein said gas turbine has moving blades at three or more stages, and a plurality of nozzles each having two side walls and at least two blade portions formed between said two side walls, each said blade portion having a dimension between its inlet-side end and its outlet-side end of 100 mm or greater and the combustion gas temperature at an inlet of said gas turbine is 1260° C. or higher and the exhaust gas temperature at an outlet is 530° C. or higher, said waste-heat recovering boiler provides steam having a temperature of 530° C. or higher.

12. A gas turbine comprising:

a compressor for compressing air;

a plurality of nozzles for directing combustion gas;

a turbine rotor; and a plurality of moving blades which are connected in said turbine rotor;

said nozzles being provided in a ring-arrangement opposite to said moving blades, and being of a casting of a nickel-base superalloy which remains intact in a 900° C.-14 kg/mm² rupture test for 300 hours or longer, and which does not substantially cause a cracking in welding beads 80 mm long formed by one-path TIG-welding, each said nozzle having two side walls and at least one blade portion formed between said walls, and said blade portion having a relatively larger thickness at a combustion gas inlet side than that at a combustion gas outlet side, and having a dimension between said side walls of 70 mm or greater and a dimension between its inlet-side end and its outlet-side end of 100 mm or greater, wherein there is provided a cavity at said larger thickness side of said blade portion, into which coolant gas enters through an opening at one of said side walls so as to cool said blade portion, there is provided a clearance formed by pin-fins at said smaller thickness side of side blade portion, and wherein there is provided a slit-clearance of a coolant gas outlet at the end edge portion of said smaller thickness side blade portion.

13. A gas turbine comprising:

a compressor for compressing air;

a plurality of nozzles for directing combustion gas;

a turbine rotor; and a plurality of moving blades which are connected in said turbine rotor;

said nozzles being provided in a ring-arrangement opposite to said moving blades, each nozzle having two side walls and at least one blade portion formed between said two side walls, and being formed of a nickel-base superalloy consisting essentially of, by weight: 0.05 to 0.20% carbon, 15 to 25% Co, 15 to 25% Cr, 1.0 to 3.0% Al, 1.0 to 3.0% Ti, 1.0 to 3.0% Nb, 5 to 10% W, and the balance consisting essentially of Ni, the combination of the (Al+Ti) content and the tungsten content being determined within a pentagonal shadowed area including the boundary shown in FIG. 5, five vertices of which are: A(2.5% of (Al+Ti), 10% W) , L(5% of (Al+Ti), 10% W) , D(5% of (Al+Ti), 5% W), E(3.5% of (Al+Ti), 5% W), and F(2.5% of (Al+Ti), 7.5% W).

14. A gas turbine comprising:

a compressor for compressing air;

a plurality of nozzles for directing combustion gas;

a turbine rotor; and a plurality of moving blades which are connected in said turbine rotor;

said nozzles of three or more stages being provided in a ring-arrangement opposite to said moving blades of three or more stages, each nozzle having two side walls and at least one blade portion formed between said two side walls;

all of said stage nozzles being of a casting of a nickel-base alloy comprising, by weight: 0.05 to 0.20% carbon, 20 to 25% Co., 15 to 25%Cr, 1.0 to 3.0% Al, 1.0 to 3.0% Ti, 1.0 to 3.0% Nb, 5 to 10% W, and at least 42.5% Ni, said casting remaining intact in a 900° C.-14 kg/mm² rupture test for 300 hours or longer.

15. A gas turbine nozzles formed of a nickel-base superalloy consisting essentially of, by weight: 0.05 to 0.20% carbon, 20 to 25% Co, 15 to 25% Cr, 1.0 to 3.0% Al, 1.0 to 3.0 Ti, 1.0 to 3.0 Nb, 5 to 10% (W+Mo) and the balance consisting essentially of Ni, the combination of the (Al+Ti) content and the tungsten content being determined within a pentagonal shadowed area including the boundary shown in FIG. 5 five vertices of which are: A(2.5% of (Al+Ti), 10% W), L(5% of (Al+Ti), 10% W), D(5% of (Al+Ti), 5% W), E(3.5% of (Al+Ti), 5% W), and F (2.5% of (Al+Ti), 7.5% W).

16. A gas turbine nozzle formed of a nickel-base superalloy consisting essentially of, by weight: 0.05 to 0.20% carbon; 20 to 25% Co; 15 to 25% Cr; 1.0 to 3.0% Al; 1.0 to 3.0 Ti; 1.0 to 3.0 Nb; 5 to 10% (W+Mo); at least one of 0.001 to 0.03% B, up to 1.5% Hf, up to 2% Re, up to 2% V, up to 0.5% Y, up to 0.5% Sc and up to 0.5% one or more of rare earth elements; and the balance content and the tungsten content being determined within a pentagonal shadowed area including the boundary shown in FIG. 5, five vertices of which are: A(2.5% of (Al+Ti), 10% W), L(5% of(Al+Ti), 10% W), D(5% of (Al+Ti), 5% W), E(3.5% of (Al+Ti), 5% W), and F(2.5% of (Al+Ti), 7.5% W).

17. A nickel-base superalloy consisting essentially of, by weight: 0.05% to 0.20% carbon; 20 to 25% Co; 15 to 25% Cr, 1.0 to 3.0% Al; 1.0 to 3.0% Ti; 1.0 to 3.0% Nb; 5 to 10% (W+Mo) the balance consisting essentially of Ni the combination of the (Al+Ti) content and the tungsten content being determined within a tetragonal shadowed area including the boundary shown in FIG. 5, four vertices of which are: M(3.14% of (Al+Ti), 8.6% W), N(4.7% of (Al+Ti), 8.6% W), O (4.7% of (Al+Ti), 6.05% W), and P of (3.14% (Al+Ti), 6.05% W).

18. A nickel-base superalloy consisting essentially of, by weight: 0.05 to 0.20% carbon; 20 to 25% Co; 15 to 25% Cr; 1.0 to 3.0 Al; 1.0 to 3.0% Ti; 1.0 to 3.0% Nb; 5 to 10% (W+Mo); at least one of 0.001 to 0.03% B, up to 1.5% Hf, up to 2% Re, up to 2% V, up to 0.5% Y, up to 0.5% Sc and up to 0.5% one or more of rare earth elements; and the balance consisting essentially of Ni, the combination of the (Al+Ti) content and the tungsten content being determined within a tetragonal shadowed area including the boundary shown in FIG. 5, four vertices of which are: U(3.14% of (Al+Ti), 8.6% W), N(4.7% of (Al+Ti), 8.6% W), 0(4.7% of (Al+Ti), 6.05% W), and P of (3.14% (Al+Ti), 6.05% W).

19. A gas turbine comprising a plurality of nozzles of at least three stages which are exposed to combustion gas and a plurality of moving blades of at least three stages, wherein:

said nozzles at each stage are provided in a ring-arrangement being opposite to said moving blades, each of which has at least one blade portion and side walls provided at the both ends of said blade portion, and wherein:

said nozzles except for those at the first stage are formed of a nickel-base superalloy consisting essentially of, by weight: 0.05 to 0.20% carbon, 15 to 25% Co, 15 to 25% Cr, 1.0 to 3.0% Al, 1.0 to 3.0% Ti, 1.0 to 3.0% Nb, 5 to 10% W, and at least 42.5% Ni, the combination of (Al+Ti) content and the tungsten content being determined within a pentagonal shadowed including the boundary shown in FIG. 5, five vertices of which are: A(2.5% of (Al+Ti), 10% W), L(5% of (Al+Ti), 10% W), D(5% of (Al+Ti), 5% W), E(3.5% of (Al+Ti), 5% W), and F(2.5% of (Al+Ti), 7.5% W).

20. A gas turbine comprising a plurality of nozzles of at least three stages which are exposed to combustion gas and a plurality of moving blades of at least three stages, wherein:

said nozzles at each stage are provided in a ring-arrangement being opposite to said moving blades, each of which has at least one blade portion and side walls provided at the both ends of said blade portion, and wherein:

said nozzles except for those at the first stage are formed of a nickel-base superalloy consisting essentially of, by weight: 0.05 to 0.20% carbon, 15 to 25% Co, 15 to 25% Cr,10 to 3.0% Al, 1.0 to 3.0% Ti, 1.0 to 3.0% Nb, 5 to 10% W, 0.001 to 0.03% B, up to 1.5% Hf, up to 2% Re, up to 2% V, up to 0.5% Y, up to 0.5% Sc, up to 0.5% one or more rare earth elements, and balance of Ni and unavoidable impurities, the combination of (Al+Ti) content and the tungsten content being determined within a pentagonal shadowed including the boundary shown in FIG. 5, five vertices of which are: A(2.5% of (Al+Ti), 10% W), 1,(5% of (Al+Ti), 10% W), D(5% of (Al+Ti), 5% W), E(3.5% of (Al+Ti), 5% W), and F(2.5% of (Al+Ti), 7.5% W).

21. A gas turbine comprising a plurality of nozzles of at least three stages which are exposed to combustion gas and a plurality of moving blades of at least three stages, wherein:

said nozzles at each stage are provided in a ring-arrangement being opposite to said moving blades, each of which has at least one blade portion and side walls provided at the both ends of said blade portion, and wherein:

said nozzles except for those at the first stage are formed of a nickel-base superalloy consisting essentially of, by weight: 0.05 to 0.20% carbon, 20 to 25% Co, 15 to 25% Cr, 1.0 to 3.0% Al, 1.0 to 3.0% Ti, 1.0 to 3.0% Nb, 5 to 10% W, and at least 42.5% Ni, and said nozzles at the first stage are formed of a cobalt-base alloy consisting essentially of, by weight:0.2 to 0.6% carbon, up to 2% Si, up to 2% Mn, 25 to 35% Cr, 5 to 15% Ni, 3 to 10% W, 0.003 to 0.03% B, up to 0.5% Ti, up to 0.5% Nb, up to 0.5% Zr, and at least 50% Co.

22. A gas turbine comprising a combustor, a plurality of nozzles of at least three stages which are exposed to combustion gas generated in said combustor and a plurality of moving blades of at least three stages, wherein:

said combustor is provided with a liner which is made of a nickel-base alloy consisting essentially of, by weight: 0.05 to 0.2% carbon, up to 2% Si, up to 2% Mn, 20 to 25% Cr, 0.5 to 5% Co, 5 to 15% Mo, up to 5% W, up to 0.02% B, and at least 60% Ni.

23. A gas turbine comprising a rotor, a plurality of nozzles of at least three stages which are exposed to combustion gas and a plurality of moving blades of at least three stages each of which is mounted on said rotor by means of embedding, wherein:

said moving blades except for those at the first stage are formed of a casting nickel-base alloy consisting essentially of, by weight: 0.07 to 0.25% carbon, up to 1% Si, up to 1% Mn, 12 to 20% Cr, 5 to 15% Co, 1 to 5% Mo, 1 to 5% W, 0.005 to 0.03% B, 2 to 7% Ti, 3 to 7%, Al, up to 5% Ta, up to 5% Re up to 0.5% at least one, of rare earth elements, up to 1.5% Nb, up to 0.5% Zr, up to 0.5% Hf, up to 0.5% V, and at least 50% Ni, whose metal structure comprises γ-phase.

24. A gas turbine according to claim 23, wherein at least the surface region of each said moving blade at other than the first and the second stages, which is exposed to combustion gas, is provided with a diffusion coating layer of any one of Al, Cr and "Al+Cr".

25. A gas turbine comprising discs of at least three stages, a plurality of nozzles of at least three stages which are exposed to combustion gas and a plurality of moving blades each of which is mounted on said discs by means of embedding, wherein said discs at least at the second and the following stages are formed of a martensitic steel having a creep rupture strength of not less than 50 kg/mm$^2$ at 450° C. for $10^5$ hours.

26. A gas turbine comprising a plurality of moving blades of at least three stages which are exposed to combustion gas and a plurality of shrouds provided in a ring-arrangement being opposite to the distal ends of said blades wherein:

said shrouds, which are opposite to said moving blades at the first stage, are formed of a nickel-base alloy consisting essentially of, by weight: 0.05 to 0.2% carbon, up to 2% Si, up to 2% Mn, 15 to 27% Cr, 5 to 10% Co, 1 to 15% Mo, up to 5% W, up to 0.02% B, and at least 60% Ni, and said shrouds other than those of the above first group, which are opposite to said blades at the third stage and the following stages, are formed of an iron-base alloy consisting essentially of, by weight: 0.25 to 0.6% carbon, up to 2% Si, up to 2% Mn, 20 to 27% Cr, 20 to 30% Ni, up to 0.5% Nb, up to 0.5% Ti, and at least 50% Fe.

27. A gas turbine comprising a rotor, a plurality of nozzles of at least three stages which are exposed to combustion gas and a plurality of moving blades of at least three stages each of which is mounted on said rotor by means of embedding, wherein:

each of said nozzles has at least one blade portion and side walls provided at the both ends of said blade portion, and wherein:

said nozzles at the second stage are formed of a casting nickel-base alloy whose creep rupture temperature at 6 kg/mm$^2$ for $10^5$ hours is not lower than 800° C., said nozzles at the third stage are formed of another casting nickel-base alloy whose creep rupture temperature at 6 kg/mm$^2$ for $10^5$ hours is not lower than 750° C., and said nozzles at the first stage are formed of a casting cobalt-base alloy whose creep rupture temperature at 6 kg/mm$^2$ for $10^5$ hours is not lower than 900° C.

28. A gas turbine according to claim 27, wherein:

said moving blades at the second stage are formed of a casting nickel-base alloy whose creep rupture temperature at 14 kg/mm$^2$ for $10^5$ hours is not lower than 800° C., and said moving blades at the third stage are formed of another casting nickel-base alloy whose creep rupture temperature at 14 kg/mm$^2$ for $10^5$ hours is not lower than 750° C.

29. A gas turbine according to claim 27, wherein:

said nozzles at the second and the third stages are formed of a casting nickel-base alloy whose creep rupture temperature at 6 kg/mm$^2$ for $10^5$ hours is not lower than 800° C.

* * * * *